(12) United States Patent
Kawanishi et al.

(10) Patent No.: US 7,427,371 B2
(45) Date of Patent: Sep. 23, 2008

(54) METHOD OF PRODUCING ANTI-GLARE FILM

(75) Inventors: Naoyuki Kawanishi, Kanagawa (JP); Tadashi Hayashi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/839,220

(22) Filed: May 6, 2004

(65) Prior Publication Data

US 2004/0223220 A1 Nov. 11, 2004

(30) Foreign Application Priority Data

May 8, 2003 (JP) ............... 2003-130477

(51) Int. Cl.
*B29D 11/00* (2006.01)
(52) U.S. Cl. .................. 264/2.5; 219/69.11; 219/69.17; 264/1.36; 264/1.6
(58) Field of Classification Search .................. 264/1.1, 264/1.36, 2.5, 219, 1.34, 1.6; 425/808; 219/69.11, 219/69.17
See application file for complete search history.

(56) References Cited

U.S. PATENT DOCUMENTS

| 4,374,158 | A | | 2/1983 | Taniguchi et al. | |
|---|---|---|---|---|---|
| 4,375,588 | A | * | 3/1983 | Frei | 219/69.17 |
| 5,698,114 | A | * | 12/1997 | Magara et al. | 219/69.17 |
| 5,880,557 | A | | 3/1999 | Endo et al. | |
| 6,210,858 | B1 | | 4/2001 | Yasuda et al. | |
| 6,353,199 | B1 | * | 3/2002 | Hosaka et al. | 219/69.11 |
| 6,383,559 | B1 | | 5/2002 | Nakamura et al. | |

FOREIGN PATENT DOCUMENTS

| EP | 0 798 095 A1 | 10/1997 |
|---|---|---|
| JP | 59-50401 A | 3/1984 |
| JP | 02-245702 A | 10/1990 |
| JP | 5-13021 A | 1/1993 |
| JP | 7-48527 A | 2/1995 |
| JP | 2000-275401 A | 10/2000 |
| JP | 2000-275404 A | 10/2000 |

* cited by examiner

*Primary Examiner*—Mathieu D. Vargot
(74) *Attorney, Agent, or Firm*—Birch, Stewart, Kolasch & Birch, LLP

(57) ABSTRACT

An antiglare film producing method of film production by surface embossing to polymer film is provided. The polymer film includes a support of triacetyl cellulose, and an antireflection layer overlaid thereon. An embossing roller is used for surface embossing to a front surface of the support or a surface of the anti-reflection layer. In the film producing method, the embossing roller is produced according to electrodischarge machining (EDM). A surface of the embossing roller has an arithmetic average roughness Ra of 0.3-1.0 micron, and has a protruding and retreating pattern with an average cycle length RSm of 5-30 microns.

9 Claims, 7 Drawing Sheets

PF1

PF2

METHOD OF PRODUCING ANTI-GLARE FILM

This Nonprovisional application claims priority under 35 U.S.C. § 119(a) on patent application Ser. No(s). 2003-130477 filed in JAPAN on May 8, 2003, the entire contents of which are hereby incorporated by reference.

BACKGROUND OF THE INVENTION

1. Field of the Invention

The present invention relates to antiglare film, method of producing the same, anti-reflection film, polarizing plate, and image display device. More particularly, the present invention relates to antiglare film, and a method of producing the same both with high performance and with great ease, and anti-reflection film, polarizing plate, and image display device.

2. Description Related to the Prior Art

Anti-reflection film is provided in several sorts of image display devices, such as a liquid crystal display (LCD), a plasma display panel (PDP), an electro luminescence display (ELD), a cathode-ray tube (CRT) and the like. The anti-reflection film is used for an eyeglass, of a lens incorporated in a camera. Several types of the anti-reflection films have been proposed. Some of them have a multi-layers structure or a nonuniform layer structure, and are widely used. A film support is provided with a plurality of transparent layers of metal oxides, so as to prevent the reflection in a wide wavelength range of a visible ray.

Such transparent layers of metal oxides are usually formed in methods of vapor deposition. As the methods, there are chemical vapor deposition (CVD) and physical vapor deposition (PVD). Specifically in the PVD, some substances are evaporated, such that a gas thereof in form of molecules or atoms forms a thin layer. The PVD is often made in vacuum deposition method and sputtering method. However, those are unsuitable for mass production, due to low productivity.

In production of the anti-reflection film, the PVD is often carried out on a film support, while a metal layer on the film support is provided with the protruding and retreating surface pattern in accordance with the way of use. In this type of the anti-reflection film, parallel transmittance becomes lower than in the anti-reflection film having a smooth surface on which that vapor deposition is performed. As the protruding and retreating surface pattern scatters the external light to suppress mirroring. The produced anti-reflection film has antiglare property. Accordingly, such anti-reflection films improve the display quality of the image display device.

Instead of the methods of vapor deposition, the following publications propose methods of producing the anti-reflection film by coating a film support with a solution containing inorganic micro particles for forming an anti-reflection layer: JP-B 60-059250 (corresponding to JP-A 56-084729) and JP-A 59-050401. In JP-B 60-059250, a solution is cast on a film support to form an anti-reflection layer including inorganic micro particles and micro voids. After the solution is dried and forms an anti-reflection layer on the film support, it is processed in gas activation. Thereby, a gas leaves the coating layer, and the micro voids are formed in the coating layer. JP-A 59-050401 discloses a multi-layer structure having a support, a high refractive index layer and a low refractive index layer overlaid on the former and formed from coating of polymer or inorganic micro particles. In addition, the document suggests provision of a middle refractive index layer disposed between the support and the high refractive index layer.

JP-A 2-245702 discloses anti-reflection film in which micro particles of two or more compounds, such as $MgF_2$ and $SiO_2$, are contained, and a proportion of mixture of those is changed in the thickness direction of the film. According to JP-A 2-245702, the change in the proportion of the compounds for the particles is effective in changing the refraction index within the film, to obtain a similar optical effect to that of JP-A 59-050401 disclosing the high and low refractive index layers in the dual layer structure. In this anti-reflection film, the micro particles are fixed to a support through $SiO_2$ produced in thermal decomposition of the ethyl silicate. In the thermal decomposition, carbon dioxide and gaseous water are generated from the low refractive index layer through the combustion of the ethyl group. Thereby, micro voids are formed between the micro particles in the low refractive index layer.

JP-A 5-013021 teaches the improvement of the anti-reflection film of JP-A 2-245702. In the improvement, the micro voids are filled with binder. Further, JP-A 7-048527 teaches anti-reflection film containing binder and inorganic particles of porous silica. Furthermore, JP-A 11-006902 discloses a three-layer structure of film in which a low refractive index layer is overlaid on a support and includes plural inorganic micro particles together with micro voids, and coated with coatings in a wet manner. This is characterized in application of all the coatings in the wet manner at a reduced manufacturing cost, and has an intention of strengthening the film even with a lowered reflection.

To impart antiglare properties to the anti-reflection film, various methods are known, including application of a coating an anti-reflection layer to an initially roughened support with a protruding and retreating pattern. Another method is to add mat particles to coating solution for an anti-reflection layer in order to form a protruding retreating surface pattern. JP-A 2000-275401 and 2000-275404 propose improvements of the anti-reflection films in JP-A 11-006902. At first, a flat anti-reflection film is produced, and a surface thereof is embossed to form the protruding and retreating surface pattern.

In general, the antiglare film or anti-reflection film is secured and positioned on the outermost side of an image display device. Typically when the film is used in a display device for a television set, computer, portable digital electronic instrument or the like, incidental outer force is likely to be exerted to the film. So high resistance to force to scratch, depress or damage the film is required in the practical use. To keep resistance to outer force high, it is conceivable to raise smoothness of the surface by lowering friction or surface energy of the surface, or to raise force of bonds between the plural layers overlaid on one another for high resistance against being peeled. However, it is basically necessary to add at least one hard coat layer which has a characteristically high hardness sufficient for being resistant to outer force. The hard coat layer is directly adjacent to the support of polymer film, has a thickness from several microns to tens of microns, and is formed to have hardness which corresponds to pencil hardness of H or higher, preferably 2H or higher.

Although the plural documents disclose micro voids between micro particles in the anti-reflection film, no document discloses optical characteristic of the illustrated voids. In these anti-reflection films, the micro voids are filled with the binder such that the anti-reflection film may be stronger. However, when the micro voids are filled with the binder, it becomes harder to decrease the refractive index of the anti-reflection film enough.

Also, a serious problem arises in failure in reproduction in good quality due to forming of above-described protruding and retreating pattern for antiglare properties. If a partial protruding or retreating region on the surface is larger than a cell included in numerous image display cells, it is likely that transmitted light through a single cell is condensed by a lens effect of the partial region. Also, light components of red, green and blue transmitted light are unacceptably mixed in the color by the partial regions if passed through adjacent cells. Otherwise, not only the wide view angle and the high speed response but also the high definition are required so much to obtain a high image quality. The high definition is realized by decreasing a cell size. In this case, for example, when the cell size is so smaller that the display has at least 133 ppi (pixel per inch), then the light transmits through the anti-reflection film, and the light perceived by a user has the nonuniform brightness, which cases the dazzling on the display. Therefore, the quality of the anti-reflection film becomes lower as a product.

A problem in providing the hard coat layer lies in the insufficiency of the embossed protruding and retreating pattern both in the depth direction and in the two-dimensional direction. This is because the embossing for imparting the antiglare properties is partially blocked by the hardness of the hard coat layer. Unwanted results occur in insufficiency in the antiglare effects, or low performance according to the dazzling appearance.

SUMMARY OF THE INVENTION

In view of the foregoing problems, an object of the present invention is to provide antiglare film, and a method of producing the same both with high performance and with great ease, and anti-reflection film, polarizing plate, and image display device.

In order to achieve the above and other objects and advantages of this invention, an antiglare film producing method of film production by surface embossing to polymer film is provided. The polymer film includes a support and an anti-reflection layer overlaid thereon, and an embosser is used for surface embossing to a surface of the anti-reflection layer or a back surface of the support. The antiglare film producing method includes a step of producing the embosser according to electrodischarge machining. A surface of the embosser has an arithmetic average roughness Ra equal to or more than 0.3 micron and equal to or less than 1.0 micron, and has a protruding and retreating pattern with an average cycle length RSm equal to or more than 5 microns and equal to or less than 30 microns.

The electrodischarge machining is electrically negative electrodischarge machining in which liquid with kerosene is used, a discharging electrode produced from material containing copper or brass is used, and voltage is applied thereto and is equal to or more than 100 V and equal to or less than 400 V.

The liquid includes particles at an amount equal to or more than 1 gram per liter and equal to or less than 20 grams per liter, and the particles have an average grain diameter equal to or more than 1 micron and equal to or less than 10 microns. The particles are formed from at least one of graphite, silicon, and molybdenum sulfide.

The embosser is produced from material having Vickers hardness equal to or more than 500 Hv and equal to or less than 1,500 Hv.

The embosser is produced from material plated with a selected one of a hard chrome plating, a nickel plating containing phosphorus or a combination of phosphorus and boron, and a chrome plating or nickel plating formed by simultaneous precipitation of particles of at least one compound selected from titanium carbide (TiC), tungsten carbide (WC), silicon carbide (SiC), boron carbide ($B_4C$), and titanium boride ($TiB_2$).

Furthermore, there is a step of thermally hardening a plated layer formed by the plating. The thermal hardening is effected at temperature equal to or more than 300° C. and equal to or less than 1000° C., and for at least one hour.

The polymer film contains cellulose acylate.

The polymer film has a multi-layer structure, and further includes a hard coat layer disposed between the support and the anti-reflection layer.

In one preferred embodiment, the polymer film has a multi-layer structure, and further includes a primer layer disposed between the support and the anti-reflection layer. A hard coat layer is disposed between the primer layer and the anti-reflection layer.

In one aspect of the invention, antiglare film produced by the antiglare film producing method as defined above is provided.

In another aspect of the invention, anti-reflection film comprising the antiglare film as defined above is provided.

In one aspect of the invention, a polarizing plate includes a polarizer, and two protecting layers disposed on respectively surfaces of the polarizer. At least one of the two protecting layers comprises the antiglare film as defined above.

In still another aspect of the invention, an image display device including the antiglare film as defined above is provided.

Furthermore, polymer film is provided according to the present invention. The polymer includes a support, and an anti-reflection layer overlaid on the support. A selected one of a surface of the anti-reflection layer and a back surface of the support is embossed by an embosser. The embosser is produced according to electrodischarge machining, and includes a surface which has an arithmetic average roughness Ra equal to or more than 0.3 micron and equal to or less than 1.0 micron, and has a protruding and retreating pattern with an average cycle length RSm equal to or more than 5 microns and equal to or less than 30 microns.

Consequently according to the invention, antiglare film can be produced both with high performance and with great ease.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

[Imparting of Antiglare Properties]

Figure 1:
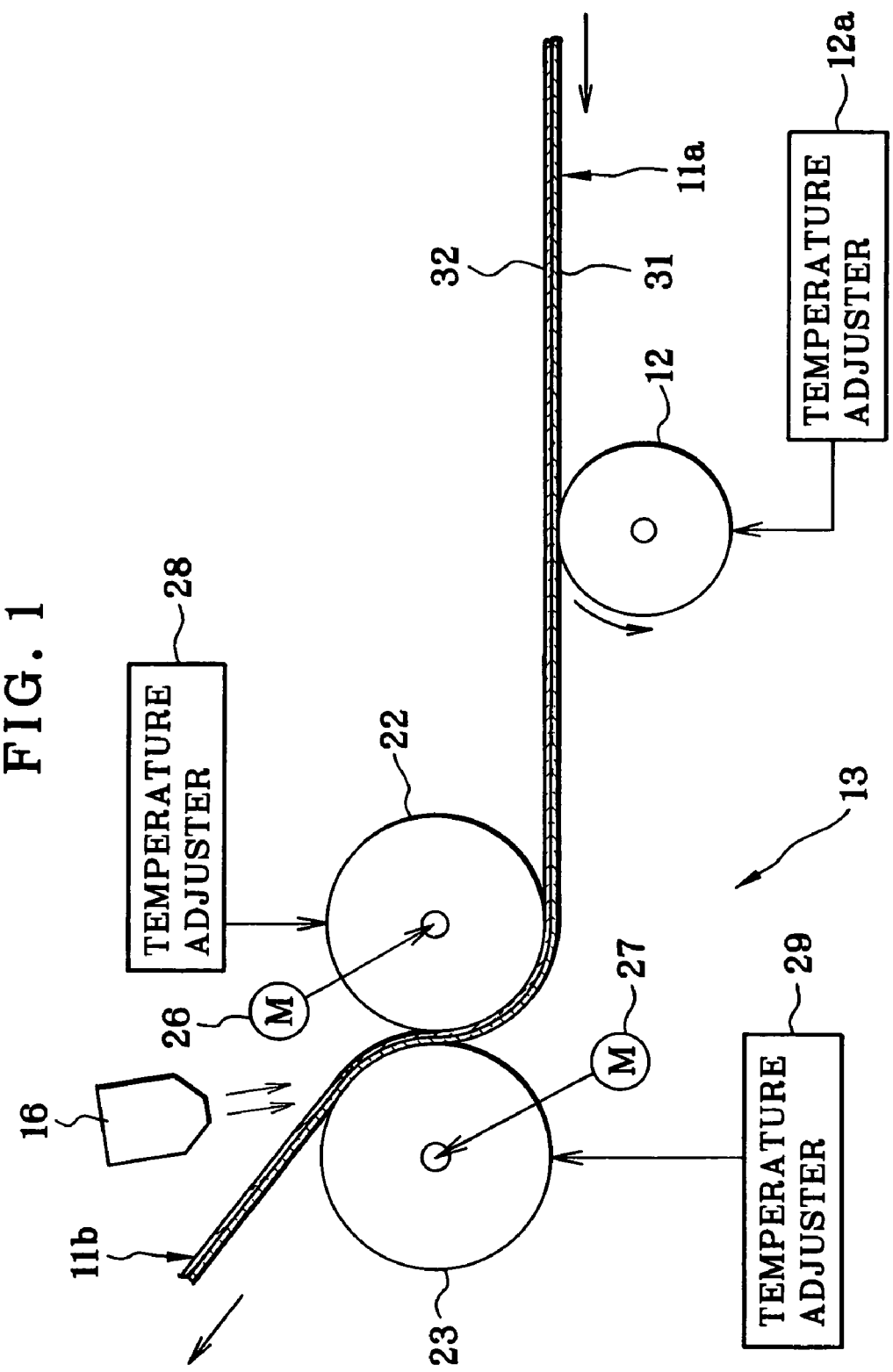
FIG. 1 is an explanatory view in front elevation, illustrating a system for producing antiglare anti-reflection film.

In FIG. 1, a system for imparting of antiglare properties to polymer film is schematically illustrated. Note that the polymer film before having the antiglare properties is herein referred to anti-reflection film 11a. The polymer film after imparting of the antiglare properties is referred to antiglare anti-reflection film 11b. The imparting system includes a jacket roller 12 for application of heat, and a one-surface embossing calender device 13 as an embossing device. A gas fan or blower 16 is disposed downstream from the one-surface embossing calender device 13. The one-surface embossing calender device 13 includes an embossing roller 22 and a backup roller 23. The embossing roller 22 is provided with a rotational control unit 26 and a temperature adjuster 28. The backup roller 23 is provided with a rotational control unit 27 and a temperature adjuster 29. To transport the film in the system for imparting antiglare properties, feed rollers are used as required for various purposes. Such feed rollers are not depicted in FIG. 1.

The anti-reflection film 11a is constituted by a support layer group 31 and an anti-reflection layer 32. The support layer group 31 includes a transparent support, and if required, has a multi-layer structure. The anti-reflection layer 32 is overlaid on the support layer group 31, and consists of one or more coatings having inorganic micro particles.

The jacket roller 12 applies heat to the anti-reflection film 11a coated with the coating solution before the embossing. This operation of the jacket roller 12 is herein referred to as a preheating step. The jacket roller 12 is a double jacket roller, with which a temperature adjuster 12a is connected, and adjusts temperature of heat exchange medium contained in a jacket. The heat is transmitted to the anti-reflection film 11a, which is heated to a predetermined temperature.

The embossing roller 22 is formed from metal, and has an embossing surface to operate as an embosser. The backup roller 23 is formed from metal, and has a smooth surface. The embossing roller 22 is in a position opposed to the anti-reflection layer 32 of the anti-reflection film 11a. The backup roller 23 is in a position opposed to the support layer group 31. The embossing and backup rollers 22 and 23 squeeze the anti-reflection film 11a by applying pressure, and rotate and transport the anti-reflection film 11a. The rotational control units 26 and 27 control the embossing pressure for the squeezing of the embossing and backup rollers 22 and 23 and their rotational speed. The anti-reflection film 11a is embossed by cooperation of the embossing and backup rollers 22 and 23 to obtain the antiglare anti-reflection film 11b. Also, the temperature adjusters 28 and 29 control the peripheral surface temperature of the embossing and backup rollers 22 and 23 at a certain level optimized for embossing. Furthermore, the gas fan or blower 16 sends a flow of gas toward the anti-reflection layer 32 with the embossed surface of the antiglare anti-reflection film 11b immediately downstream from the embosser, to lower the temperature of the antiglare anti-reflection film 11b.

According to the above process, the anti-reflection film 11a becomes the antiglare anti-reflection film 11b by the process of embossing on the surface having the anti-reflection layer 32. The antiglare properties can be provided with a constant back-to-front thickness without the anti-reflection properties. The uniformity of the thickness of the antiglare anti-reflection film 11b depends on the number and optical construction of optical interference layers constituting the anti-reflection layer 32. For example, the anti-reflection layer 32 may be a three-layer form including a low refractive index layer, a high refractive index layer and a middle refractive index layer disposed in a sequence from the outside of the anti-reflection film 11b. Each of the low, high and middle refractive index layers is provided with a thickness of $n\lambda/4$, where n is a refractive index. The thickness of the each layer can fluctuate within a range of ±3% of the average thickness. When the thickness fluctuates over this range, then the anti-reflection properties become much poorer.

[Film Surface Pattern]

Recently the resolution or definition of the image quality in a display device has been considerably higher. The protruding and retreating pattern of the antiglare anti-reflection film 11b is required to have a small cycle length for fineness in the dimension. The antiglare anti-reflection film 11b should be constructed in a suitable manner for use in the pixel density of 50 ppi (pixels per inch) or more. To this end, an average cycle length (RSm) of the protruding and retreating pattern of the surface is equal to or more than 5 microns and equal to or less than 100 microns, and preferably equal to or more than 5 microns and equal to or less than 50 microns, and desirably equal to or more than 5 microns and equal to or less than 30 microns.

A protruding and retreating pattern of the surface depends upon a desired level of antiglare properties. If the protruding and retreating pattern is too small, effects of scattering outer light is lower to have low performance of antiglare film. If the protruding and retreating pattern is too great, scattering is excessive to lower the image definition or whiten the image. Therefore, the antiglare anti-reflection film 11b of the invention has an arithmetic average roughness (Ra) equal to or more than 0.01 micron and equal to or less than 2 microns, and preferably equal to or more than 0.05 micron and equal to or less than 2 microns, and desirably equal to or more than 0.05 micron and equal to or less than 1 micron.

Also, an inclination angle of the profile of the protruding and retreating pattern should be sufficiently small according to the invention. Values of the inclination angle are not single, but varies in a certain distribution owing to the irregularity. However, should great values of angles be included largely among all the values, external appearance of the antiglare anti-reflection film 11b may be whitish to an unwanted extent. Consequently, the inclination angle is in a range of 0.5-10 degrees inclusive, and preferably in a range of 0.5-5 degrees.

In the various examples described herein, an average cycle length of a protruding and retreating pattern (RSm), an arithmetic average roughness (Ra), and an average inclination angle are measured by a two-dimensional roughness measuring device SJ-400 (trade name, produced by Mitsutoyo Corporation), or a micromap device produced by Ryoka Systems Inc. Of course, other available devices can be used for two-dimensional roughness measurement.

[Embossing]

A type of embossing process according to the preferred embodiment is a roll embosser pressing. However, any suitable type of embossing can be used. For example, a flat panel embosser pressing and a continuous belt embosser pressing may be used. Among those, preferable examples are the continuous belt embosser pressing and the roll embosser pressing in consideration of continuous machining of very long material. A particularly preferable example is the roll embosser pressing, because of high degree of freedom in controlling the embossing pressure and the pressing temperature.

The embossing process according to the invention is hot embossing in the field of embossing. An embosser is heated, pressed on an article to be embossed, and is provided with a pattern. The hot embossing is different from thermal melting film casting, thermal melting lamination, and different from cold embossing in which an embosser is maintained at a temperature equal to or lower than that of the preheated film to provide the film with a pattern. A heating device for applying an embosser may have any suitable structure for heating for 80° C. or higher and having small changes in temperature distribution of the surface temperature. Preferable examples of such heating devices are an electric wire heater, electric induction heating, an infrared heater, and a jacket heater. Heat exchange medium is contained in the jacket heater and circulated in a path inside the embosser, and may be hot water, oil, steam, and the like. In view of the use for the roll embosser pressing, preferable examples among those are an electric wire heater, an electric induction heating device, for example, a heat roll produced by Tokuden Co., Ltd, and a jacket heater. In consideration of a small distribution in the surface temperature, particularly preferable examples are an electric induction heating device and a jacket heater.

Any suitable material can be used for the embossing roller 22 for the roll embosser pressing with sufficient rigidity for being resistant to embossing pressure, for example, metals, ceramic materials, synthetic resins, composite materials of synthetic resins and one of metal, glass, and the like. In view of durability of the embosser, at least the surface of the embossing roller 22 is preferably coated with alloy of iron containing carbon and chromium, and with Vickers hardness of 500 Hv or higher. The thickness of the coating, the materials for the embosser and the like will be described in detail. The embossing roller 22 can have any suitable outer diameter for the purpose of the use in the roll embosser pressing. For example, the outer diameter may be 50-3,000 mm in view of practical possibility of the roll production. However, a preferable outer diameter of the embossing roller 22 can be equal to or greater than 50 mm and equal to or smaller than 2,000 mm. This is because of high precision in view of the straight property of the anti-reflection film 11a of an order of several microns per meter in the width direction of the anti-reflection film 11a. Also, it is because the embossing roller 22 should be prevented from having an excessively great weight.

Also for the backup roller 23 opposed to the embossing roller 22, any suitable material can be used with sufficient rigidity for being resistant to embossing pressure, for example, metals, ceramic materials, synthetic resins, composite materials of synthetic resins and one of metal, glass and the like. In view of durability of the embosser, at least the surface of the embossing roller 22 is preferably coated with alloy of iron containing carbon and chromium, and with Vickers hardness of 500 Hv or higher. A thickness of the coating is in a range from 10 microns to 500 microns, and preferably in a range from 50 microns to 500 microns. Also, hard chrome plating can be used preferably in particular, because of high Vickers hardness, high resistance to corrosion, and suitability for abrasive finishing of the surface. For the roller surface, a surface roughness of the backup roller 23 should be as small as possible for the purpose of maintaining smoothness of a surface of the anti-reflection film 11a on the side of the support layer group 31 as a product with antiglare properties. Specifically, an arithmetic average roughness (Ra) of the backup roller 23, which is a characteristic generally utilized for the mirror surface finish of metal surfaces, can be preferably equal to or less than 0.01 micron.

The backup roller 23 for use in the roll embosser pressing according to the invention may have any suitable outer diameter. Within a possible range of roll production, the outer diameter of the backup roller 23 may be 50-3,000 mm. However, the diameter can be 50-2,000 mm, because of high precision in view of the straight property of the anti-reflection film 11a of an order of several microns per meter in the width direction of the anti-reflection film 11a. Also, it is because the embossing roller 22 should be prevented from having an excessively great weight.

The backup roller 23 may be cooled. For a cooling structure, the inside of the backup roller 23 may be hollow and have a jacket structure through which cool water or other suitable coolant can circulate. Alternatively, a gas fan or blower may be used to blow the backup roller 23 with chilled gas. The cooling of the backup roller 23 is effective in reducing volatilization or evaporation of additives such as plasticizers from the antiglare anti-reflection film 11b typically if the antiglare anti-reflection film 11b contains such additives. Also, the contact of the antiglare anti-reflection film 11b with the backup roller 23 directly after the pressing can have a fixed embossed pattern because of the immediate cooling.

Various conditions of pressing includes pressure to the anti-reflection film 11a, surface temperature of the embosser, and press time. The embossing pressure to the anti-reflection film 11a is equal to or higher than $1 \times 10^5$ Pa, and preferably in a range from $1 \times 10^5$ Pa to $1 \times 10^7$ Pa, and desirably in a range from $5 \times 10^5$ Pa to $5 \times 10^6$ Pa. In consideration of diameter ranges of the embossing and backup rollers 22 and 23 used herein, the linear contact pressure of those is equal to or higher than 1,000 N/cm, and preferably in a range from 1,000 N/cm to 50,000 N/cm, and desirably in a range from 5,000 N/cm to 30,000 N/cm.

In the present invention, a surface temperature of a surface of the embossing roller is preferably 80° C. or higher. The surface temperature may be preferably in a range of 80-220° C., and desirably in a range of 100-200° C.

Types of pressing in which the press time can be precisely defined are a flat panel embosser pressing and a continuous belt embosser pressing. The press time are in a range of 1-600 seconds inclusive, preferably in a range of 10-600 seconds, and desirably in a range of 10-300 seconds. As the roll embosser pressing is used in the present embodiment, an effective press time is determined according to a length of the contact of a nipped portion between the embossing and backup rollers 22 and 23 with pressure, and a transporting speed of the anti-reflection film 11a. A length of the contact of the nipped portion viewed in the transporting direction is changeable, and depends upon diameters, resiliency and other physical characteristics of the embossing and backup rollers 22 and 23, and upon pressure, temperature and other pressing conditions. The transporting speed is preferably in a range of 1-50 m/min. inclusive, preferably in a range of 1-30 m/min., and desirably in a range of 5-30 m/min.

In the roll embosser pressing of the present embodiment, application of the embossing pressure by means of rotational shaft has a problem in that flexure occur in the roller to cause irregularity in the embossing pressure in the width direction. In order to reduce the influence of the problem, it is possible to apply a crown roll method and a bend adjusting method. In the crown roll method, an amount of flexing is predicted according to the embossing pressure, to adjust the roller diameter. In the bend adjusting method, pressure is applied to the rotational shaft in reverse to the pressing direction. In the crown roll method, at least one of the embossing and backup rollers 22 and 23 can have an inclined shape or curved shape with an outer diameter varying with a difference range per a unit width of the roller. The difference range within which the roll outer diameter varies is 5-50 microns per one (1) meter of the width of the roll, preferably 5-30 microns, and desirably 10-30 microns. The bend adjusting pressure depends on the physical characteristics including the diameter or elasticity of the embossing and backup rollers 22 and 23 and the pressing conditions including the embossing pressure and temperature. The bend adjusting pressure as reaction is in a range of 3-20% of the embossing pressure, preferably in a range of 3-15% of the same, and desirably in a range of 5-10% of the same.

It is necessary in the embossing of the present invention to manage influence of dust very precisely in consideration of the optical film for use in an image displaying apparatus. Specifically, devices or element in the producing system for embossing and rewinding should be installed under a condition of a clean room environment of class 100 or higher, preferably class 10 or higher. Furthermore, it is preferable to use a dust eliminating device at a step before the embossing step.

Various dust eliminating methods of dry types are known. U.S. Pat. No. 4,577,362 (corresponding to JP-A 59-150571) discloses contact of a non-woven fabric, blade or other material with a film surface. JP-A 10-309553 discloses a method in which the film surface is blown with very clean air free from dust at high flow rate, to remove dust from the film surface, and the dust with the air is ejected through an ejection port. An available example of machine for blowing compressed air with ultrasonic vibration and for sucking deposited dust is known as New Ultra Cleaner (trade name) produced by Shinko Co., Ltd. Those methods or devices are characterized in a combined use of ultrasonic wave and shearing force exerted by flow of air. A borderline air layer of flowing air is formed at a thickness that is between tens of microns and hundreds of microns. The flowing air exerts shearing force to the deposited dust. In combination, vibration is effected ultrasonically. As a result, dust can be eliminated at high efficiency. JP-A 10-290964 discloses a method of removing foreign material deposited with static charge. In this document, positive and negative ions of air are injected to neutralize the charge to separate foreign material, which is ejected by a flow of air sent by a separate structure. JP-A 62-131500 discloses a widely used charge eliminating method which can be used in the present embodiment. JP-A 2-043157 also discloses a usable dust eliminating method.

Also, wet types of dust elimination distinct from the dry types are suggested and known. For example, there is a method in which a film is introduced into a washing bath, in which-an ultrasonic oscillator applies ultrasonic waves thereto to remove dust. U.S. Pat. No. 3,956,790 (corresponding to JP-B 49-013020) discloses a method in which film is supplied with washing liquid, and subjected to blow and suction of dust eliminating gas at a high flow rate. U.S. Pat. No. 6,503,332 (corresponding to JP-A 2001-038306), JP-A 2002-079200 and U.S. Pub. No. 2002/0027628 (corresponding to JP-A 2002-040245) disclose a wiping method in which a resilient material is moistened with liquid, and rubs and wipes a surface of film.

The degree of the dust elimination for the present embodiment should be sufficiently high. Specifically, surfaces of the anti-reflection film 11a or the antiglare anti-reflection film 11b after being subjected to the above-described dust elimination in a clean room can have foreign material or particles with a diameter of 10 microns or more at an amount of 10 particles or less per $m^2$, preferably 1 particle or less per $m^2$, and desirably 0.1 particle or less per $m^2$.

Furthermore, it is preferable to add a preheating step of preheating the anti-reflection film 11a before the embossing. The preheating step is preferably constructed to raise the temperature of the anti-reflection film 11a gradually from the room temperature to the embossing temperature. The addition of the preheating step is effective in preventing various problems, which are abrupt softening and changes in the volume of the anti-reflection film 11a upon access of the anti-reflection film 11a at the room temperature to the embossing roller 22 at 80° C. or higher, and preventing occurrence of wrinkles according to friction between the anti-reflection film 11a and the embossing roller 22.

A heating device for preheating may have any suitable structure. Preferable examples of such heating devices are a device for blowing hot gas, a heating roller for heating in contact, an induction heating by means of microwave, and an infrared heater for heating with radiation heat. Especially, the heating roller is preferable because of high efficiency in thermal conductivity in relation to the anti-reflection film 11a, a small space for installation, and a quick rise of the temperature upon the startup of the heating. Examples of heating rollers are a general-use double type of the jacket roller 12, and an electric induction heat roll produced by Tokuden Co., Ltd. The film temperature after the preheating is in a range of 25-220° C. inclusive, preferably in a range of 25-150° C., and desirably in a range of 40-100° C. In order to control the temperature in those ranges, a feedback control may be effected by adding a feedback control unit (not shown) for monitoring heat and for adjusting the heating temperature of the heating device.

The film after hot embossing has high temperature. If the film receives tension during the transport or is contacted by various rollers without sufficient drop of the temperature or without sufficient drop in the compression modulus of elasticity, then deformation or disappearance of the patterning of the film is likely to occur. However, the forcible cooling step is added immediately after the hot embossing, to prevent such problems. However, the features of the invention do not depend upon the existence or lack of the forcible cooling directly after the embossing, or upon any of methods of the forcible cooling.

Examples of forcible cooling methods are blowing of the gas fan or blower 16 with cold gas to the antiglare anti-reflection film 11b as illustrated in FIG. 1, or heat dissipation by contact of a chill roll. The cooling is so effective that the antiglare anti-reflection film 11b after being cooled has the temperature of 80° C. or lower, preferably in a range of 10-80° C., and desirably in a range of 15-70° C. To measure the temperature of the antiglare anti-reflection film 11b, a non-contact type of infrared thermometer can be preferably used. Also, a feedback control may be effected by adding a feedback control unit for monitoring the cooling and for adjusting the low temperature used in the cooling device.

A process of moisture conditioning can be used before the winding process in the present embodiment for roll embossing of the long material. The moisture conditioning is a process to adjust an amount of moisture contained in the long material. However, the feature of the invention does not depend upon the existence or lack of the process of the moisture conditioning, or on how the moisture conditioning is effected. A preferred example of a humidistat for the moisture conditioning can include devices for controlling the temperature and the humidity, a fan or blower for blowing gas, or the like. According to the addition of the moisture conditioning, it is possible to adjust moisture content in the film before winding the antiglare anti-reflection film 11b in a roll form by means of thermal drying for the purpose of obtaining the moisture content at an acceptable level, or by means of blow of gas with suitable humidity. This is effective in obtaining optical film provided with a preferred embossed pattern at a high quality. It is noted that deformation or modification is likely to occur in resin if excessive rise occurs in the temperature and humidity. It is therefore preferable in the moisture conditioning to determine processing conditions within a range consistent with specific requirements in the embossed pattern, optical characteristics or other items related to the practical use. For example, the heating temperature should be determined by considering a glass transition temperature Tg or thermal deformation temperature of the transparent polymer film to be processed, or considering resin modification at the start of the resin flow.

An embosser or the embossing roller 22 having an embossing surface mainly operable for the embossing is now described in detail. Certainly it is possible in general to produce the embossing roller 22 according to any of various known methods suitable for forming a pattern on a surface of metal, such as electrodischarge machining, shot machining, etching, laser machining and the like. Among those, the electrodischarge machining is used in particular according to the present invention. Note that machining methods which enables forming of a highly regularized protruding and retreating pattern is unacceptable for embossers because of inevitable problem of optical interference. In contrast, the electrodischarge machining is preferable because of automated forming of an irregularly protruding and retreating pattern. The etching and laser machining are available only on the condition of very suitably adapting a design of a resist pattern or adapting operation of a laser beam.

Figure 2:
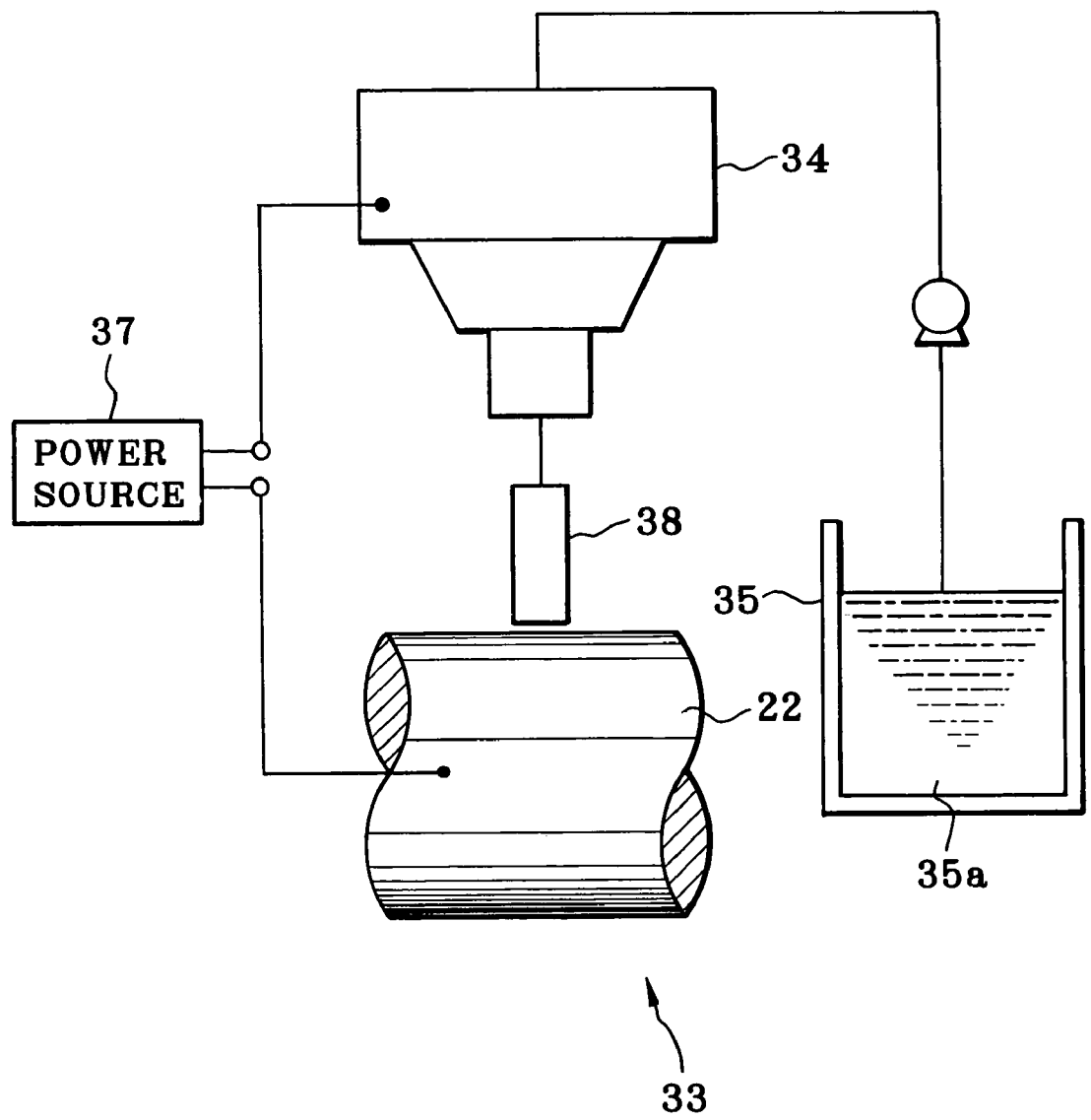
FIG. 2 is an explanatory view in block diagram, schematically illustrating electrodischarge machining of an embossing roller to be used in the producing system.

In FIG. 2, the electrodischarge machining in the embosser production is schematically illustrated. An electrodischarge machining (EDM) device 33 is a commercially available type. The electrodischarge machining device 33 includes an electrodischarge machining head 34, a liquid supply tank 35 for containing machining liquid 35a, a power source 37, and a discharging electrode 38. The discharging electrode 38 is positioned close to an embossing roller to be machined. A pump is operated to send the machining liquid 35a through the electrodischarge machining head 34 to the discharging electrode 38, so the machining liquid 35a reaches a portion of the surface of the embossing roller 22 to be machined. Opposing surfaces of the discharging electrode 38 and the embossing roller 22 are not completely smooth. When the electric field strength increases upon turning on of the power source 37, there occurs spark discharge, because a peak of the electric field strength occurs at one certain point of one of the two surfaces at a level sufficient for local ionization of the machining liquid 35a. Each single shot of the discharge forms a small crater in the surface of the embossing roller 22. Numerous craters are formed to produce an embossed pattern. Note that it is possible to add a machining liquid bath with the machining liquid 35a, and to effect the electrodischarge by dipping the embossing roller 22 and the discharging electrode 38 in the machining liquid 35a in the liquid bath.

The temperature of the sparks is as high as thousands of degrees centigrade or more. In small regions with occurrence of sparks, the surface material of the embossing roller 22 is likely to be melted or volatilized. In the present embodiment, the machining liquid 35a consists of kerosene. Upon sparks, the kerosene is also heated locally, gasified quickly, to expand the volume. At this time, an enclosing operation occurs according to inertia of surrounding part of the kerosene. Locally high pressure occurs at the positions of the spark. However, this high pressure is effective in removing the partially fluidized material of the embossing roller 22 from its surface in a sufficiently quick manner. The embossing roller 22 is driven in the width direction and driven for rotation, to continue the electrodischarge machining on the entire peripheral surface. For the machining of the entire peripheral surface, various methods can be used in addition to the continuous machining by the driving the embossing roller 22 in the width direction and in the rotational direction. For example, the discharging electrode can be supported with a movable structure. Furthermore, a system can operate for machining for each of predetermined regular size of an area.

The metal for the embosser preferably should be iron alloy containing carbon and chromium, and with Vickers hardness of 500 Hv or more, and desirably with Vickers hardness equal to or more than 500 Hv and equal to or less than 1,500 Hv. Examples with such a characteristic include high carbon steel, chromium-molybdenum steel, and stainless steel. Note that in order to obtain the Vickers hardness, the Vickers test method has a step of using a 136-degree pyramidal diamond indenter which forms a square indent. Any sample is pressed by the indenter with test force. An indent is left on the sample and has a square shape on the surface. A length of a diagonal of the square indent is evaluated in relation to the test force, to obtain the Vickers hardness number. Note that the preferable hardness may not be determined according to the Vickers hardness, but can be determined by other units and measuring methods at a level corresponding to the hardness described herein.

In order to harden the surface, a nitriding process, a plating process and the like can be used. The nitriding process is reaction of iron alloy such as stainless steel in a vacuum space by use of nitride such as ammonium. Examples of the plating processes are hard chrome plating, and nickel plating in combination of either phosphorus or phosphorus and boron, which is according to Kanigen plating or Kaniboron plating (trade name, a plating system suggested by Japan Kanigen Co., Ltd.). Also, it is possible to use chrome plating or nickel plating formed by simultaneous precipitation of micro particles of at least one compound selected from the following group: titanium carbide (TiC), tungsten carbide (WC), silicon carbide (SiC), boron carbide ($B_4C$), and titanium boride ($TiB_2$). The plating is formed on the material surface before finishing the embosser. It is further preferable to harden the plated layer thermally at temperature equal to or more than 300° C. and equal to or less than 1000° C., and for at least one (1) hour after the plating operation. Note that simultaneous precipitation is precipitation of two or more solids at the same time from the material in the course of cooling. A layer thickness of those hardened coatings is in a range of 5-300 microns inclusive, and preferably in a range of 20-100 microns.

Important parameters of the material for the embossing roller 22 are hardness, melting point and thermal conductive coefficient. Those influence an embossed surface form, embossing speed and the like due to heat created by the electrodischarge. If the hardness or melting point differs, the embossed surface form or amount will be different after heating and melting of the surface material for the embosser even though the heat quantity is equal. Furthermore, the conductive coefficient influences the speed of flow of the heat applied locally by the spark discharge. This results in changes in a protruding and retreating cycle length of the pattern or its depth.

In addition to changes in the arithmetic average roughness Ra and the average protruding and retreating cycle length RSm, surface hardening process causes changes in the irregularity in the corrugated form or arrangement of protrusions or recesses as a result of overlapping of great and small protrusions or recesses in the embosser produced by the electrodischarge machining. Naturally, the optical characteristics of the film provided with the embossed pattern are influenced, such as antiglare properties and dazzling appearance. However, panel surface properties of the film is also influenced by the changes in the surface irregularity, for example granular properties, glossy or subdued properties, or the like. The use of the electrodischarge machining to produce the embosser enables production of transparent polymer films having various types of surface properties by suitably predetermining combinations of the machining conditions and the surface materials for the embosser.

In the present invention, an example of device for electrodischarge machining can be a die-sinker electrodischarge machining (EDM) device of general-purpose types, such as products of Mitsubishi Electric Corporation, Sodick Inc. and the like. A preferable type of electrodischarge machining device can include a CAD/CAM structure controllable at a smallest unit of one micron in the position in order to producing extremely fine protruding or retreating shapes.

Two types of electrodischarge machining methods are known, including positive electrodischarge and negative electrodischarge. In the positive electrodischarge, positive voltage is applied to the discharging electrode. In the negative electrodischarge, negative voltage is applied to the discharging electrode. However, the negative electrodischarge is desirable according to the invention. If the positive electrodischarge is used, a quantity of heat generated on the surface of the workpiece is remarkably high, to produce a pattern in an unwanted irregular protruding and retreating form in spite of high speed of the machining. In contrast, the negative electrodischarge is advantageous in that the protruding and retreating pattern of the surface can be formed as intended initially on the workpiece in spite of quick wear of the discharging electrode.

It is preferable in the invention to use copper for producing the discharge electrode, because of low electric resistance and high thermal conductivity. The thickness of the flat electrode is 5 mm or less, preferably 3 mm or less, and desirably 2 mm or less. This is for the purpose of minimizing the local discharge for each of the points, reducing energy of the discharge, and finely forming the protruding and retreating pattern. Note that, in consideration of those ranges of the thickness, brass can be used preferably if copper should not be used with sufficient rigidity.

Various methods are known for control of the voltage of the electrodischarge, for example a method of generating a pulse on the power supply side, a capacitor discharging method in which an RC circuit is utilized, the RC circuit consisting of the power source circuit and the electrodischarge machining device. Although the control of pulses with high precision is possible even at high voltage and great current because of recent technical innovation in the switching of the power source, it is still preferable in the invention to use the capacitor discharging method in order to obtain an intended protruding and retreating form even in a large area of surfaces. This is because adequate control is extremely difficult even with the pulse generation on the power supply side, and because of irregularity in the waveform in the current of the discharge, typically for the use of the electrodischarge to the fine protruding and retreating unevenness as a purpose of the present invention.

The voltage to be applied can be preferably at a high level to obtain high efficiency in emitting heat or melted particles, because a distance between the discharging electrode and a workpiece can be set great during the electrodischarge. The voltage may be 100-500 V in a general use because of an upper voltage limit of a semiconductor power source, but preferably can be equal to or more than 100 V and equal to or less than 400 V according to the invention.

Kerosene of any of suitable types can be used as the machining liquid 35a for use in the electrodischarge machining. Furthermore, it is possible to add micro particles of a certain compound with an average grain diameter equal to or more than 1 micron and equal to or less than 10 microns, to the kerosene at an amount equal to or more than 1 g/l and equal to or less than 20 g/l, for the purpose of providing more minute patterning. Examples of such compounds include graphite, silicon, molybdenum sulfide, alumina, silicon carbide and the like. Such micro particles may be used only as one compound, or may be used in combination of two or more compounds.

The shape of the embosser according to the invention can be determined by three parameters in a manner similar to the surface of the antiglare anti-reflection film 11b. An average cycle length (RSm) of the protruding and retreating pattern of the surface of the embosser is in a range of 5-100 microns inclusive, preferably in a range of 5-50 microns, and desirably in a range of 5-30 microns. An arithmetic average roughness (Ra) of the surface of the embosser is in a range of 0.05-20 microns inclusive, preferably in a range of 0.1-10 microns, and desirably in a range of 0.3-5 microns. Distribution of angles defined by the protruding and retreating pattern is in a range of 0.5-10 degrees, and preferably in a range of 0.5-5 degrees.

Various preferable paths for the polymer film in relation of the embossing and backup rollers 22 and 23 can be used in the embossing. Such paths are described by referring to FIGS. 3-7. In FIGS. 3-7, elements similar to those in FIG. 1 are designated with identical reference numerals. Note that there is one transporting roller 39, which can be added as required for modifications of the paths.

Figure 3:
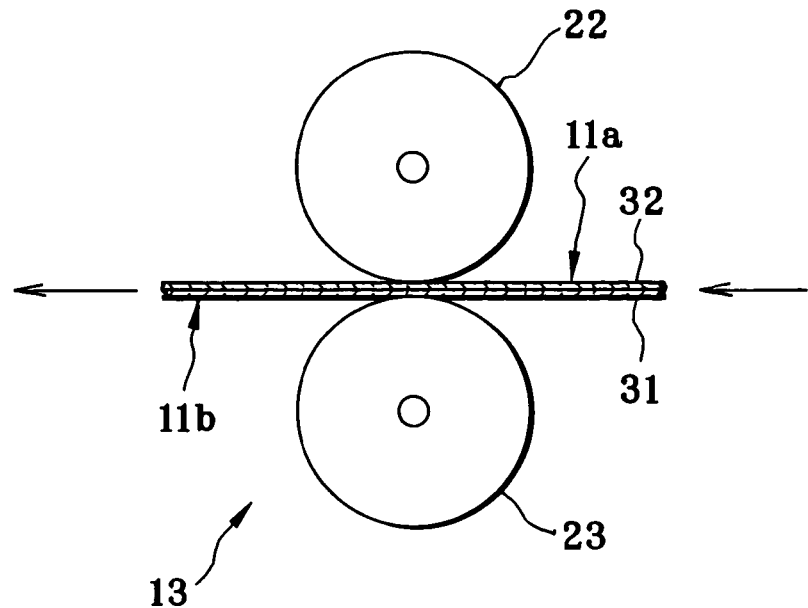
FIG. 3 is an explanatory view in front elevation, illustrating a film path in an embossing calender device included in the producing system.
Figure 4:
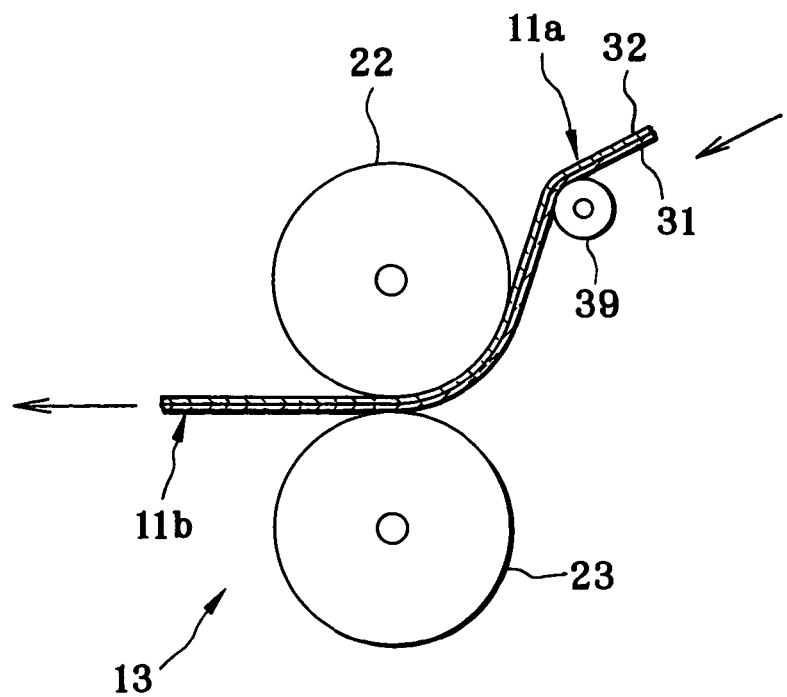
FIG. 4 is an explanatory view in front elevation, illustrating a preferred film path, in which the film is wrapped on the entrance side of the embossing roller.
Figure 5:
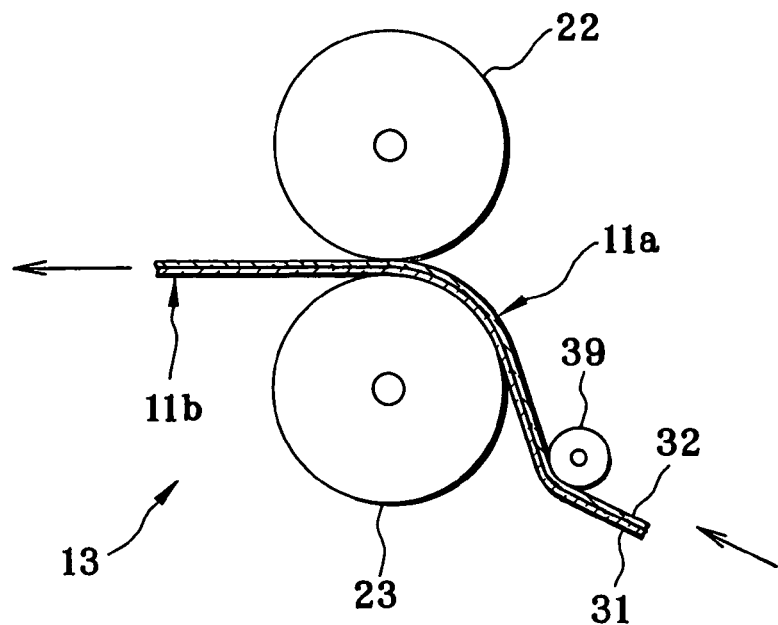
FIG. 5 is an explanatory view in front elevation, illustrating a preferred film path, in which the film is wrapped on the entrance side of the backup roller.
Figure 6:
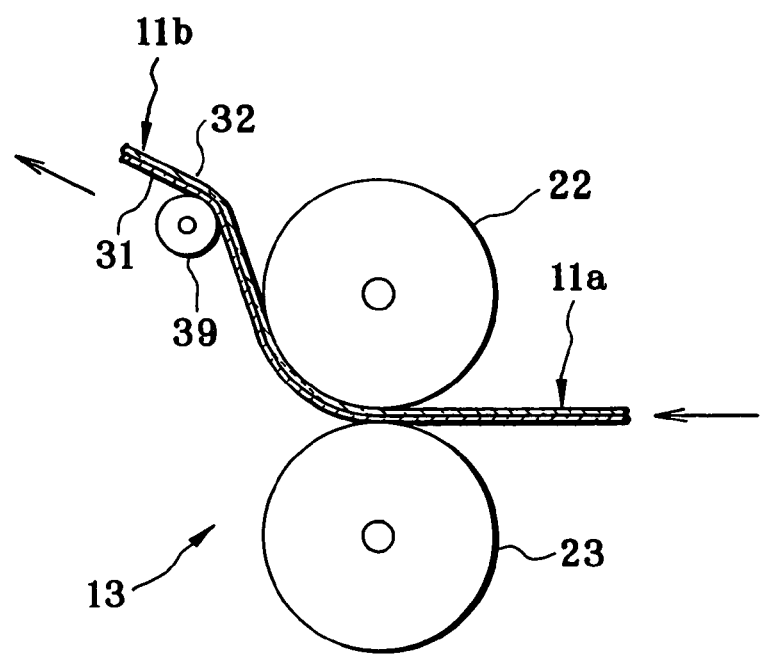
FIG. 6 is an explanatory view in front elevation, illustrating a preferred film path, in which the film is wrapped on the exit side of the embossing roller.

One of the best shapes for the path is illustrated in FIG. 3. The path directs the anti-reflection film 11a without determining an angular shape of entry or exit relative to the pressing direction of the embossing and backup rollers 22 and 23. In FIG. 4, a path is illustrated, which is effective in preheating the anti-reflection film 11a before the pressing. The anti-reflection film 11a is wrapped on the embossing roller 22 before being directed toward the pressing zone. In FIG. 5, a path is illustrated, which is effective in previously cooling the anti-reflection film 11a before the pressing. The anti-reflection film 11a is wrapped on the backup roller 23 in a cooled state before being directed toward the pressing zone.

For the exit side of the pressing zone, a similar path can be conceived. If long heating time is desired, a path of FIG. 6 can be used, in which the film is wrapped on the embossing roller 22 on the exit side. If cooling of the film is desired immediately after the pressing, a path of FIG. 7 can be used, in which the film is wrapped on the backup roller 23 on the exit side.

Figure 7:
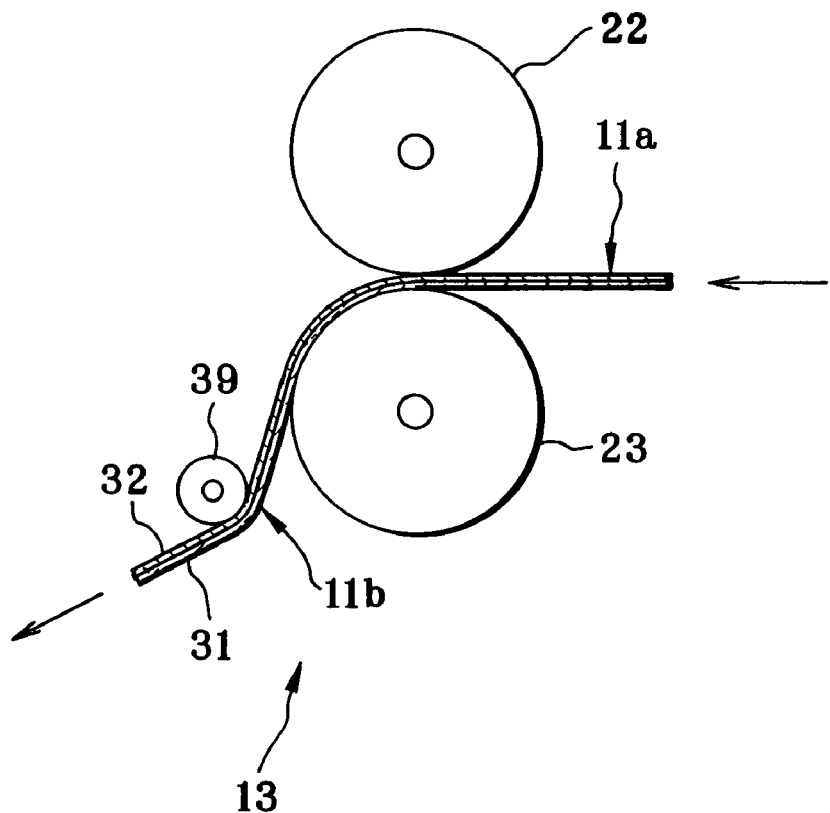
FIG. 7 is an explanatory view in front elevation, illustrating a preferred film path, in which the film is wrapped on the exit side of the backup roller.

Five (5) paths are conceivable for the transport of the polymer film between the embossing and backup rollers 22 and 23. A structure of FIG. 3 is preferable in that there is no wrapping at the entrance or the exit at the set of the embossing and backup rollers 22 and 23. A structure of FIG. 4 is more preferable in that there is wrapping on the embossing roller 22 at the entrance, but no wrapping on the embossing roller 22 or the backup roller 23 at the exit. A structure of FIG. 1 is a combination of those of FIGS. 4 and 7, is the most preferable in that there is wrapping on the embossing roller 22 at the entrance, but wrapping on the backup roller 23 at the exit while the backup roller 23 is kept cool. A wrap angle on at least one of the embossing roller 22 and 23 is suitably determined according to characteristics of the polymer film and the embossing and backup rollers 22 and 23, and the transporting conditions. The polymer film characteristics include the thickness, resiliency, thermal conductivity and surface roughness. The roller characteristics include the roller diameter, temperature, thermal conductivity and surface roughness of the embossing and backup rollers 22 and 23. The transporting conditions include transporting speed and tension.

[Production of Anti-Reflection Film]

Figure 8:
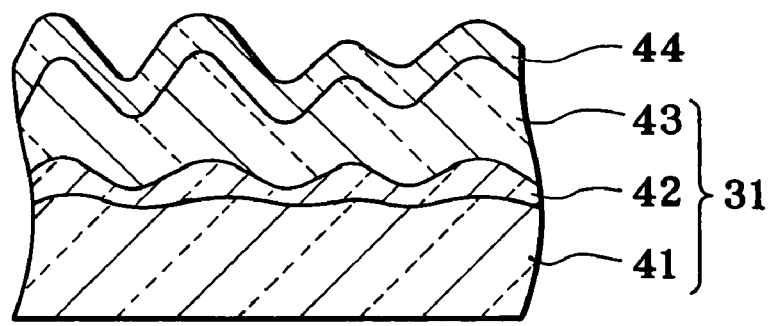
FIG. 8 is a cross section, partially broken, illustrating the antiglare anti-reflection film after being embossed.
Figure 9:
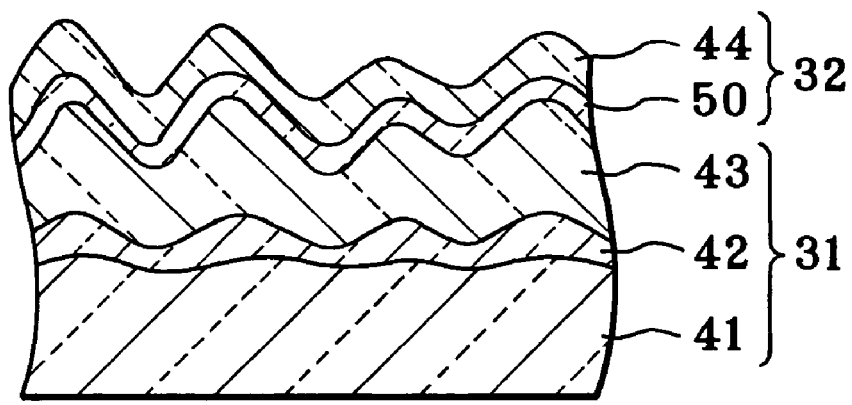
FIG. 9 is a cross section, partially broken, illustrating preferred antiglare anti-reflection film being embossed and having two different refractive index layers.
Figure 10:
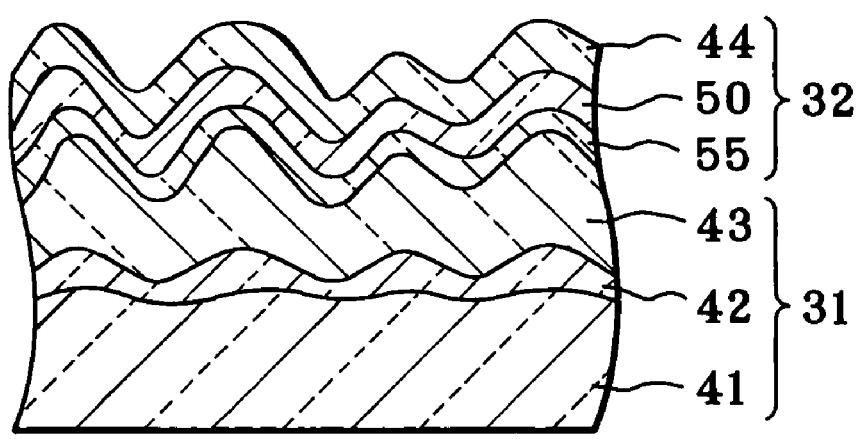
FIG. 10 is a cross section, partially broken, illustrating preferred antiglare anti-reflection film being embossed and having three different refractive index layers.

In FIGS. 8-10, examples of the antiglare anti-reflection film 11b after the embossing process of the invention are illustrated. In an example of FIG. 8, the antiglare anti-reflection film 11b includes layers arranged in an upward sequence of a transparent support 41, a primer layer 42, a hard coat layer 43, and a low refractive index layer 44. In an example of FIG. 9, layers are arranged in an upward sequence of the transparent support 41, the primer layer 42, the hard coat layer 43, a high refractive index layer 50, and the low refractive index layer 44. In an example of FIG. 10, layers are arranged in an upward sequence of the transparent support 41, the primer layer 42, the hard coat layer 43, a middle refractive index layer 55, the high refractive index layer 50, and the low refractive index layer 44.

A combined layer including the transparent support 41, the primer layer 42 and the hard coat layer 43 of FIGS. 8-10 corresponds to the support layer group 31 of FIG. 1. Also, a single layer or plural layers constituted by one or more of the low, high and middle refractive index layers 44, 50 and 55 correspond to the anti-reflection layer 32. In FIGS. 8-10, the deformation due to the embossing occurs in a concentrated manner at the primer layer 42 in the antiglare anti-reflection film 11b having any of such structures. The hard coat layer 43 and the anti-reflection layer 32 have an unchanged thickness. In the support, there is a small deformation.

In FIGS. 8-10, it is preferable according to the invention for the antiglare anti-reflection film 11b to satisfy a condition that an optical thickness of each of the middle, high and low refractive index layers 55, 50 and 44 is equal to approximately $n\lambda/4$, or is equal to a multiple of this and an integer, where $\lambda$ is a designed wavelength. Note that the optical thickness consists of a product (n×d), where $\underline{n}$ is a refractive index, and $\underline{d}$ is a film thickness. This feature is suggested in JP-A 59-050401.

For the purpose of lowering reflectance and reducing color tint of reflected light as reflection characteristic, it is necessary for the middle refractive index layer 55 to satisfy Condition I, for the high refractive index layer 50 to satisfy Condition II, and for the low refractive index layer 44 to satisfy Condition III, where it is assumed that the predetermined wavelength $\lambda$ is 500 nm. Note that n1, n2 and n3 herein represent the respective refractive indexes of the middle, high and low refractive index layers 55, 50 and 44. Symbols d1, d2 and d3 (nm) represent the respective thickness of the middle, high and low refractive index layers 55, 50 and 44.

$$100.00 < n1 \times d1 < 125.00 \quad \text{Condition I}$$

$$187.50 < n2 \times d2 < 237.50 \quad \text{Condition II}$$

$$118.75 < n3 \times d3 < 131.25 \quad \text{Condition III}$$

There are further requirements. If the transparent support 41 is formed from triacetyl cellulose (cellulose triacetate, TAC, refractive index: 1.49) or the like, and has the refractive index in the range of 1.45-1.55, then it is necessary that the refractive index n1 should be 1.60-1.65, n2 should be 1.85-1.95, and n3 should be 1.35-1.45. If the transparent support 41 is formed from polyethylene terephthalate (PET, refractive index: 1.66) or the like, and has the refractive index in the range of 1.55-1.65, then it is necessary that the refractive index n1 should be 1.65-1.75, n2 should be 1.85-2.05, and n3 should be 1.35-1.45.

Sometimes, it is difficult to use materials having the above refractive indexes for the middle refractive index layer 55 or the high refractive index layer 50. However, it is preferably possible to use a principle of an equivalent layer as a well-known technique in the art. Plural layers can be formed to obtain their combined structure, the plural layers having the higher refractive index and the lower refractive index than the above predetermined refractive index. The combined structure can be an optically equivalent layer to the middle refractive index layer 55 or the high refractive index layer 50. Further, the reflective properties can be realized in the combined structure at the same time. Note that the present invention may provide the anti-reflection layer 32 in a multi-layer form constructed of three or more layers with effects of the equivalent layer.

In the present invention, it is preferable to use a polymer film or plastic film as the transparent support 41. Examples of polymer or plastic materials for this include the following.

cellulose esters (for example, triacetyl cellulose, diacetyl cellulose, propionyl cellulose, butyryl cellulose, acetylpropionyl cellulose, nitro cellulose);

polyamide; polycarbonate;

polyesters (for example, polyethylene terephthalate, polyethylene naphthalate, poly-1,4-cyclohexane dimethylene terephthalate, polyethylene-1,2-diphenoxyethane-4,4'-dicarboxylate, polybutylene terephthalate);

polystyrenes (for example, syndiotactic polystyrene);

polyolefins (for example, polypropylene, polyethylene, polymethylpentene);

polysulfones; polyethersulfones; polyarylate; polyetherimide; polymethylmethacrylate; and polyether ketones; and the like.

Especially, the antiglare anti-reflection film 11b can be used as a protection film for constructing one surface of a polarizing filter which is provided in an LCD, an organic electro luminescence (EL) display and the like. In this case, it is preferable to form the transparent support of triacetyl cellulose. A preferable method of producing the triacetyl cellulose is taught in JIII Journal Of Technical Disclosure Monthly Vol. 2001-1745. Further, when the antiglare anti-reflection film 11b is attached on a glass plate so as to use for the flat CRT and the PDP, then it is preferable to form the transparent support of polyethylene terephthalate or polyethylene naphthalate.

The transparent support 41 has optical transmittance of 80% or higher, and preferably 86% or higher. The transparent support 41 has haze of 2.0% or less, and preferably 1.0% or less. The transparent support 41 has a refractive index in a preferable range of 1.4-1.7 inclusive.

The middle and high refractive index layers 55 and 50 are formed by coating application, drying and hardening or curing. In applying the coating, a coating composition is constituted by micro particles having a high refractive index, thermoset monomers or monomers curable with ionizing radiation, initiator, and solvent. In the drying step, the solvent is dried. In the hardening or curing step, the composition is hardened or cured with heat and/or ionizing radiation.

Examples of micro particles having a high refractive index are preferably inorganic, and can be at least one of the oxides of metals, Ti, Zr, In, Zn, Sn, and Sb. The middle and high refractive index layers are remarkably excellent in scratch resistance and adhesion as compared with a polymer layer of a high refractive index that is formed by casting and drying a polymer solution. In order to keep stability of dispersion and strength of a formed layer after hardening or curing, it is preferable according to JP-A 11-153703 and U.S. Pat. No. 6,210,858 for the coating composition to have polyfunctional (meth)acrylate monomer, and (meth)acrylate dispersant containing an anionic group.

The average diameter of the above-described inorganic micro particles is preferably more than 1 nm and less than 100 nm according to the measurement of the coal tar counter method. If the diameter should be equal to or less than 1 nm, micro particles are unacceptably small and stability in the dispersion is too low due to too large an specific surface area. If the diameter should be equal to or more than 100 nm, particles are unacceptably large and scattering of visible light occurs due to a difference in the refractive index from the binder. Note that the high and middle refractive index layers 50 and 55 have haze of 3% or less, and preferably 1% or less.

Materials for the low refractive index layer 44 of the invention are explained now. The materials are a mixture of acrylic resin or epoxy resin and inorganic materials or micro particle thereof, whose refractive index is low. Examples of inorganic materials with a low refractive index include LiF (refractive index n=1.4), $MgF_2$ (n=1.4), $3NaF.AlF_3$ (n=1.4), $AlF_3$ (n=1.4), $Na_3AlF_6$ (n=1.33), $SiO_2$ (n=1.45) and the like. Further, as the material for the low refractive index layer 44, there are fluorine organic materials and silicone organic materials. Among those, a particularly preferable example is fluorine containing compounds which are can be hardened with heat or ionizing radiation. Kinetic friction of the curing materials for the low refractive index layer 44 is preferably in the range of 0.02-0.18, particularly of 0.03-0.15. When the kinetic friction is too high, the front surface of the antiglare anti-reflection film 11b are likely to be damaged by rubbing. Contact angle of the materials to pure water is preferably in the range of 90-130 degrees, particularly of 100-120 degrees. When the contact angle to pure water is too small, then the finger print and oil are likely to adhere easily. Therefore, stainproofness or antifouling is so small that it is hard to protect from pollution. Further, the low refractive index layer 44 may contain fillers, such as silica particles and the like, in order to have greater strength.

The fluorine containing compounds for the low refractive index layer 44 are, for example, silane containing perfluoroalkyl group, such as heptadecafluoro-1,1,2,2-tetrahydrodecyl)triethoxysilane, and the like, and also further fluorine containing polymers that are composed of fluorine containing monomer and crosslinkable elements.

Examples of the fluorine-containing monomers include fluoro olefins, such as fluoro ethylene, vinylidene fluoride, tetrafluoro ethylene, hexafluoro ethylene, hexafluoro propylene, perfluoro-2,2-dimethyl-1,3-dioxol, and the like; partially or completely fluorinated alkyl ester derivatives of (meth)acrylic acid, such as BISCOAT 6FM (trade name, produced by Osaka Organic Chemical Industry Ltd.), M-2020 (trade name, produced by Daikin Industries, Ltd.) and the like; and completely or partially fluorinated vinylethers. Among those, perfluoro olefins, and especially, hexafluoro propylene is desirable in view of a suitable refractive index, solubility, transparency, easy availability and the like.

The units for performing curing reaction are obtained by polymerization of monomers. Monomers may have a functional group for self-curing properties, and may be glycidyl (meth)acrylate, glycidyl vinylether, and the like. Also, monomers for curing reaction may have carboxyl group, hydroxyl group, amino group, sulfo group, and may be (meth)acrylic acid, methylol (meth)acrylate, hydroxyalkyl (meth)acrylate, allyl acrylate, hydroxyethyl vinylether, hydroxybutyl vinylether, maleic acid, crotonic acid, and the like. Furthermore, polymerization of the units is made for the units to have a group for curing reaction, for example, such as (meth) acryloyl group and the like. An example for use in the polymerization is acrylic chloride for reaction to hydroxyl group.

Further, monomers containing no fluorine can be polymerized by copolymerization with fluorine containing monomers and units for providing curing reaction in view of solubility into a solvent and transparency of formed layers. Any suitable monomers can be used. Examples of the monomers containing no fluorine are the following.

olefins (ethylene, propylene, isoprene, vinylchloride, vinylidene chloride, and the like);

esters of acrylic acid (methyl acrylate, ethyl acrylate, 2-ethylhexyl acrylate);

esters of methacrylic acid (methyl methacrylate, ethyl methacrylate, butyl methacrylate, ethylene glycol dimethacrylate, and the like);

styrene derivatives (styrene, divinylbenzene, vinyltoluene, alpha-methylstyrene, and the like);

vinyl ethers (methyl vinylether, ethyl vinylether, cyclohexyl vinylether, and the like);

vinylesters (vinyl acetate, vinyl propionate, vinyl cinnamate, and the like);

acrylamides (N-tert-butyl acrylamide, N-cyclohexyl acrylamide, and the like);

methacrylic amides; acrylonitrile derivatives; and the like.

JP-A 8-092323, 10-025388, 10-147739, and 2000-017028 discloses curing agents or hardening agents, which may be added to any of the above-described polymers. The use of the curing agents is necessary typically if groups for curing of the polymers are not reactive solely for curing, such groups being hydroxide group, carboxylic group, and the like. Examples of curing agents are polyisocianates, aminoplast, polybasic acids, anhydrides thereof, and the like. In contrast, if the monomer has self-curing properties, it is unnecessary to add the curing agent. However, the curing agent can be added if suitable, such as polyfunctional (meth)acrylate compound, polyfunctional epoxy compounds and the like.

In the present invention, the fluorine containing polymers preferred for the low refractive index layer 44 are random copolymer of perfluoro olefin and vinylethers or vinylesters. Preferably, such polymers have the groups having a crosslinkable property, namely groups having a property of radical reactions, such as (meth)acryloyl groups, and groups having property of ring opening polymerization, such as epoxy group, oxetanyl groups. The polymeric units having the crosslinkable group are contained in the range of 5-70 mol % in the total polymeric units of the polymer, especially of 30-60 mol %.

Further, it is preferable that the fluorine containing polymer has polysiloxane structure in order to have stainproof or antifouling properties. Any suitable method for constructing the polysiloxane structure can be used. JP-A 11-189621, 11-228631, and 2000-313709 teach the use of silicone macroazo initiator to combine component for polysiloxane block copolymerization with the polymers. JP-A 2-251555 and 2-308806 teach the use of silicone macromer to combine polysiloxane graft polymerization with the polymer. A ratio of polysiloxane to the polymer is in a range of 0.5-10 wt. %, and preferably in a range of 1-5 wt. %.

In order to have stainproofness, it is preferable to add a reactive group containing polysiloxane to the polymer. Commercially available examples of this polysiloxane are KF-100T, X-22-169AS, KF-102, X-22-37011E, X-22-164B, X-22-5002, X-22-173B, X-22-174D, X-22-167B, X-22-161AS (trade names, produced by Shinetsu Chemical Co., Ltd.), AK-5, AK-30, AK-32 (trade names, produced by Toagosei Co., Ltd.), SILAPLANE FM0275, SILAPLANE FM0721 (trade names, produced by Chisso Corporation), and the like. It is preferable that such polysiloxane is contained preferably in the range of 0.5-10 wt. % inclusive for the entirety of the solid content of the low refractive index layer 44, and especially in the range of 1-5 wt. %.

Also, the low refractive index layer 44 according to the present invention can be formed of fluorine containing compounds, such as TEFLON AF1600 (trade name, produced by E.I. du Pont de Nemours and Company, Refractive index n=1.30), CYTOP (trade name, produced by Asahi Glass, Co., Ltd., n=1.34), 17FM (trade name, produced by Mitsubishi Rayon Co., Ltd., n=1.35), OPSTAR JN-7212 (trade name, produced by JSR Corporation, n=1.40), OPSTAR JN-7228 (trade name, produced by JSR Corporation, n=1.42), and LR201 (trade name, produced by Nissan Chemical Industries, Ltd., n=1.38), and the like.

Preferable materials for the primer layer 42 are (meth) acrylic polymers, styrene type polymers, and polyesters. Any suitable monomers can be used for producing such polymers. Examples of monomers for the (meth)acrylic polymers include (meth)acrylic acid, methyl (meth)acrylate, ethyl (meth)acrylate, butyl (meth)acrylate, (metha)allyl acrylate, (metha)urethane acrylate, 2-hydroxy ethyl (meth)acrylate, and the like. Monomers for the styrene type polymers include styrene, divinyl benzene, vinyl toluene, alpha-methylstyrene, and the like. Monomers for the polyesters include condensation products of a selected one of ethylene glycol, propylene glycol, diethylene glycol, and other alcohols, and a selected one of phthalic acid, phthalic anhydride, terephthalic acid, maleic acid, maleic anhydride, and other carboxylic acids and anhydrides.

A molecular weight (or polymerization degree) of the polymer is set according to desired glass transition temperature Tg of the polymer. The glass transition temperature of the polymer contained in the primer layer 42, and the glass transition temperature of the transparent support 41 are preferably lower than the temperature at which embossing is carried out, and can be desirably in the range of 60-130° C. Further, the thickness of the primer layer 42 is preferably in a range of 0.1-50 microns, especially in a range of 0.1-20 microns.

The primer layer 42 has higher compression modulus of elasticity in a room temperature than the transparent support 41. The compression modulus of elasticity of the primer layer 42 is preferably in a range of 3-8 GPa inclusive, particularly in a range of 4-7 GPa. The difference of the compression modulus of elasticity between the transparent support 41 and the primer layer 42 is preferably in a range of 0.1-5 GPa inclusive, particularly in a range of 0.2-4 GPa.

In the present invention, the compression modulus of elasticity of the primer layer 42 at the embossing temperature T° C. should be preferably lower than that of the hard coat layer 43. The difference of the compression modulus of elasticity at the embossing temperature T° C. between the primer layer 42 and the hard coat layer 43 is in the range of 0.1-8 Gpa inclusive, and preferably 0.5-7.5 Gpa. In the present invention, the primer layer 42 is effective in reducing brightness unevenness or dazzling properties, and raising the surface hardness in the liquid crystal display of the high definition mode.

The primer layer 42 may be constructed by a combination of the above-mentioned polymers and other polymers or particles. Also, the primer layer 42 may have a crosslinking structure. Examples of the other polymers and particles include gelatin; polyvinyl alcohol; polyalginic acid and salts thereof; cellulose esters, such as triacetyl cellulose, diacetyl cellulose, propionyl cellulose, butyryl cellulose, acetylpropionyl cellulose, nitrocellulose, hydroxyethyl cellulose, hydroxypropyl cellulose; polyether ketones; polyhydric alcohols; silica particles; and alumina particles.

Monomers used for constructing the cross-linking structure can preferably have two or more ethylenically unsaturated groups. Examples of such monomers include esters of a polyhydric alcohol and a (meth)acrylic acid, such as: ethylene glycol di(meth)acrylate, 1,4-cyclohexane diacrylate, penta erythritol tetra(meth)acrylate, penta erythritol tri(meth)acrylate, trimethylolpropane tri(meth)acrylate, trimethylolethane tri(meth)acrylate, dipenta erythritol tetra(meth)acrylate, dipenta erythritol penta(meth)acrylate, penta erythritol hexa (meth)acrylate, 1,2,3-cyclohexane tetramethacrylate, polyurethane polyacrylate, polyester polyacrylate, and the like. Also, further preferred monomers include vinylbenzene, and derivatives thereof, such as 1,4-divinylbenzene, 4-vinylbenzoic acid-2-acryloyl ethylester, 1,4-divinylcyclohexanone, and the like; vinylsulfones, such as divinylsulfone, and the like; acrylamides, such as methylenebisacrylamide and the like; and methacrylamide.

Instead of the monomers having two or more ethylenically unsaturated groups, or in addition to them, the crosslinking structure may be constructed by crosslinkable functional groups. Examples of crosslinkable functional groups are isocyanate groups, epoxy groups, adilidine groups, oxazoline groups, aldehyde groups, carbonyl groups, and the like. Examples of monomers for constructing the crosslinking structure are hydrazine anoacrylate derivatives, melamine, etherized methylol, esters, urethanes, and the like. Furthermore, block isocyanate groups, for example, may be used because it can be decomposed to smaller crosslinkable groups. Other compounds may be used. Note that compounds which will have crosslinking property as a result of decomposition of compounds may be used.

In order to form the primer layer 42, the coating solution is prepared, in which polymerization initiators and polymers and/or monomers are dissolved in a solvent. It is preferable that a polymerization reaction (and cross-linking if required) is made in the solution after the coating operation. Examples of polymerization initiators are benzophenone types and other hydrogen abstraction types, and a radical cleavage types, such as acetophenone type, triazine type and the like. Among those, a single compound may be used. Also, a combination of two or more may be used and added to coating solution with monomers.

The primer layer 42 has a characteristic for strengthening adhesion between the transparent support 41 and upper layers overlaid on the transparent support 41. In view of the high strength in the adhesion, monomers can be preferably included in the primer layer 42. A proportion in the weight of the polymer to the monomer in the primer layer 42 is preferably in a range from 75/25 to 25/75, and desirably in a range from 65/35 to 35/65.

In the antiglare anti-reflection film 11b, the hard coat layer 43 is effective in maintaining scratch resistance. The hard coat layer 43 also reinforces the transparent support 41 and layers overlaid thereon. The hard coat layer 43 is formed of acrylic polymer, urethane type polymers, epoxy type polymers and silica type compounds. Pigments may be added to the coating solution for the hard coat layer 43.

Preferably, the coating solution for the hard coat layer 43 contains polymers having main chain of saturated hydrocarbons or polyethers, particularly those having main chain of saturated hydrocarbons. Further, it is preferable that the polymers having cross-linking structure are obtained by polymerization of monomers having ethylenically unsaturated groups. It is especially preferable that the monomers have two or more ethylenically unsaturated groups.

Examples of the monomers having two or more ethylenically unsaturated groups include esters of a polyhydric alcohol and a (meth)acrylic acid, such as ethylene glycol di(meth)acrylate, 1,4-cyclohexane diacrylate, penta erythritol tetra (meth)acrylate, penta erythritol tri(meth)acrylate, trimethylolpropane tri(meth)acrylate, trimethylolethane tri (meth)acrylate, dipenta erythritol tetra(meth)acrylate, dipenta erythritol penta(meth)acrylate, penta erythritol hexa (meth)acrylate, 1,2,3-cyclohexane tetramethacrylate, polyurethane polyacrylate, polyester polyacrylate, and the like. Further examples of the monomers include vinylbenzene, and derivatives thereof (1,4-divinylbenzene, 4-vinylbenzoic acid-2-acryloyl ethylester, 1,4-divinylcyclohexanone and the like), vinylsulfone (divinylsulfone and the like), acrylamide (methylene-bisacrylamide and the like), and methacrylamide.

Instead of the monomers having two or more ethylenically unsaturated groups, or in addition to them, the crosslinking structure may be constructed by crosslinkable functional groups. Examples of crosslinkable functional groups are isocyanate groups, epoxy groups, adilidine groups, oxazoline groups, aldehyde groups, carbonyl groups, and the like. Examples of monomers for constructing the crosslinking structure are hydrazine anoacrylate derivatives, melamine, etherized methylol, esters, urethanes, and the like. Furthermore, block isocyanate groups, for example, may be used because it can be decomposed to smaller crosslinkable groups. Other compounds may be used. Note that compounds which will have crosslinking property as a result of decomposition of compounds may be used.

In order to form the hard coat layer 43, the coating solution is prepared, in which polymerization initiators and monomers are dissolved in a solvent. It is preferable that a polymerization reaction (and cross-linking if required) is made in the solution after the coating operation. Examples of polymerization initiators are benzophenone types and other hydrogen abstraction types, and a radical cleavage types, such as acetophenone type, triazine type and the like. Among those, a single compound may be used. Also, a combination of two or more may be used and added to coating solution with monomers. To the coating solution for the hard coat layer 43, it is possible to add a small amount of polymers, for example, polymethylmethacrylate, polymethylacrylate, diacetyl cellulose, triacetyl cellulose, nitrocellulose, polyester, alkyd polymers, and the like.

The hard coat layer 43 has thickness in the range of 0.5-5 microns, preferably of 0.5-3 microns. The thickness of the hard coat layer 43 has a large influence on the suitability to the embossing. Namely, when the thickness is too large, suitability of the anti-reflection film to embossing becomes lower. Even when the anti-reflection film is embossed, the surface cannot have as much unevenness as has been expected. In the antiglare anti-reflection film 11b of the embodiment, the small thickness of the hard coat layer 43 is compensated for with the primer layer 42 having high surface elasticity. Furthermore, the antiglare anti-reflection film 11b may be provided with a moistureproof layer, antistatic layer and a protective layer.

Each layer in the anti-reflection film 11a can be formed in the dip coating method, air knife coating method, curtain coating method, roller coating method, wire coating method, gravure coating method, micro gravure coating method, extrusion coating method as disclosed in U.S. Pat. No. 2,681, 294, and the like. In considering minimizing the amount of the amount of solution to be cast in wet coating to prevent the unevenness of the dried layer, the methods of micro gravure coating and gravure coating are preferable. In view of uniformity of thickness of the layer in a widthwise direction, the gravure coating method is preferable in particular. Also, two or more coatings may be applied simultaneously to form the plural layers on the transparent support 41. The methods of simultaneous application of the coating solutions are described in U.S. Pat. Nos. 2,761,791, 2,941,898, 3,508,947, 3,526,528, and an article in Yuji Harazaki, *Coating Technology*, Asakura Shoten Publishing Co., Ltd. (1973), page 253.

To use the antiglare anti-reflection film 11b described herein for one surface of a surface protecting film of a polarizing element, it is necessary with alkali compounds to saponify one surface of the transparent support 41 opposite to the surface provided with the anti-reflection layer 32. For the saponification with alkali compounds, it is possible to use a selected one of the two processes to be described now.

In the first method, the transparent support 41, after the anti-reflection layer 32 is formed thereon, is dipped for at least one time in an alkali solution to make saponification of the back surface. In the second method, before or after the anti-reflection layer 32 is formed on the transparent support 41, the alkali solution is applied on a back surface of the transparent support 41 reverse to the anti-reflection layer 32. Then the layers are heated, and washed with water and/or neutralized, to saponify only the back surface of the film support 41.

The first of those methods has a merit in that saponification is made in the same process as that of the triacetyl cellulose film which is popularly used. A problem of the first method is that each layer in the produced antiglare anti-reflection film 11b becomes weaker, because the saponification is made also in the anti-reflection layer 32. When the solution for saponification remains on the surface, then the surface becomes unclean. The second of the methods is preferable to the first method, although it has not been a general-purpose type.

The anti-reflection film 11a produced according to the present invention can be used preferably in any of transmission type, reflection type, or semi-transmission type, as the protective film on the one surface of a polarizer. Any of various modes can be used, including Twisted nematic (TN) mode, Super twisted nematic (STN) mode, Vertical alignment (VA) mode, In-plane switching (IPS) mode, Optically compensated bend cell (OCB) mode, and the like. Furthermore, the antiglare anti-reflection film 11b is often used in combination with optical compensation films, an optical retardation filter, and the like. Examples of optical compensation films include a wide view film for enlarging a view angle of the liquid crystal display panel. Also, in a liquid crystal display of transmission type or semi-transmission type, the polarizer is used in combination with a marketed brightness enhancement film (polarizing separation film having a selective layer of polarized light, for example, D-BEF (trade name) produced by Sumitomo 3M Ltd.). Thus, the display panel can have properties suitable for easy recognition.

Also, the anti-reflection film 11a can be combined with a λ/4 plate to reduce reflection light from a surface or inside of an organic electro luminescence (EL) display device, because of operation for protection. Furthermore, the anti-reflection layer of the invention may be formed on a transparent support film of polyethylene terephthalate (PET), polyethylene naphthalate (PEN) or the like, for use in an image display device such as a plasma display panel (PDP), cathode ray tube (CRT) or the like.

EXAMPLES

The following experiments were made according to the present invention. However, the invention is not restricted in specific results of the experiments.

[Preparation of Coating Solution A for the Primer Layer]

200 parts by weight of resin of methyl methacrylate, whose average molecular weight was 250,000, was dissolved in mixed solvent of 480 parts by weight of methylethylketone and 320 parts by weight of cyclohexanone. Solution was obtained, and filtrated by the polypropylene filter (PPE-03) having porosities. The filter had a hole diameter of 3 microns. Thus, the filtrated solution was obtained as the coating solution A for the primer layer 42.

[Preparation of Coating Solution B for the Primer Layer]

100 parts by weight of resin of allyl methacrylate-methacrylic acid copolymer, whose average molecular weight was 440,000, was dissolved in 900 parts by weight of methylisobutylketone. Solution was obtained, and filtrated by the polypropylene filter (PPE-03) having porosities. The filter had a hole diameter of 3 microns. Thus, the filtrated solution was obtained as the coating solution B for the primer layer 42.

[Preparation of Coating Solution for the Hard Coat Layer]

306 parts by weight of a marketed mixture (DPHA, trade name, produced by Nippon Kayaku Co., Ltd.) of dipenta erythritol pentaacrylate and dipenta erythritol hexaacrylate was dissolved in a mixture solvent in which 16 parts by weight of methylethylketone and 220 parts by weight of cyclohexanone were mixed. To the solution, 7.5 parts by weight of a photo polymerization initiator IRGACURE 907 (trade name, produced by Ciba Geigy Corp.) was added. The solution was agitated so as to dissolve the photo polymerization initiator. Thereafter, 450 parts by weight of a dispersion of $SiO_2$ MEK-ST (trade name, produced by Nissan Chemical Industries Ltd.) was added to the solution. Note that the dispersion MEK-ST was dispersion in methyethylketone with an average grain diameter of 10-20 nm and 30 wt. % of solid content density. Then this solution was agitated and filtrated by the polypropylene filter (PPE-03) having porosities. The filter had a hole diameter of 3 microns. Thus, the filtrated solution was obtained as the coating solution for the hard coat layer 43.

[Preparation of Dispersion C of Titanium Dioxide]

For dispersion of titanium dioxide, the following materials were mixed: 300 parts by weight of extreme micro particles of titanium dioxide (TTO-55B, trade name, produced by Ishihara Sangyo Co., Ltd.), 10 parts by weight of dimethylamino ethyl acrylate (DMAEA, trade name, produced by Kohjin Co., Ltd.), 60 parts by weight of cationic dispersant containing phosphate group (KAYARAD PM-21, trade name, produced by Nippon Kayaku Co., Ltd.), and 630 parts by weight of cyclohexanone. They were dispersed with a sand grinder to obtain the dispersion C of titanium dioxide having an average grain diameter of 42 nm according to measurement by the coal tar method.

[Preparation of Dispersion D of Titanium Dioxide]

Figure 11:
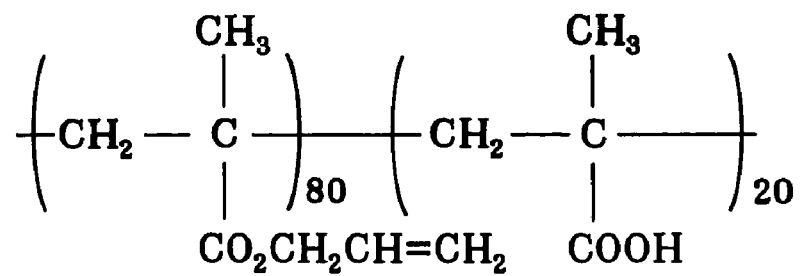
FIG. 11 is a view illustrating a formula of anionic polymer containing a crosslinkable group.

For dispersion of titanium dioxide, the following materials were mixed: 250 grams of extreme micro particles of titanium dioxide (TTO-55B, trade name, produced by Ishihara Sangyo Co., Ltd.), 37.5 grams of anionic polymer indicated in FIG. 11 and containing crosslinkable group, 2.5 grams of cationic monomer (DMAEA, trade name, produced by Kohjin Co., Ltd.), and 710 grams of cyclohexanone. They were dispersed with a mill (DYNO-Mill, trade name, produced by WA Bachofen AG), to obtain the dispersion D of titanium dioxide having an average diameter of 65 nm per unit weight.

[Preparation of Coating Solution for the Middle Refractive Index Layer]

750 parts by weight of cyclohexanone and 190 parts by weight of methylethylketone were mixed. In the mixture, 1.1 parts by weight of photo polymerization initiator IRGACURE 907 (trade name, produced by Ciba Geigy Corp.) and 0.4 parts by weight of photo sensitizer KAYACURE DETX (trade name, produced by Nippon Kayaku Co., Ltd.) were dissolved. Further, 31 parts by weight of the dispersion C of titanium dioxide, and 21 parts by weight of the marketed mixture DPHA (trade name, produced by Nippon Kayaku Co., Ltd.) of dipenta erythritol pentaacrylate and dipenta erythritol hexaacrylate were added to the mixture. Then the mixture was agitated at a room temperature for 30 minutes, and filtrated by the polypropylene filter (PPE-03) having porosities. The filter had a hole diameter of 3 microns. Thus, the filtrated solution was obtained as the coating solution for the middle refractive index layer 55.

[Preparation of Coating Solution for the High Refractive Index Layer]

540 parts by weight of cyclohexanone and 180 parts by weight of methylethylketone were mixed. In the mixture, 1.3 parts by weight of photo polymerization initiator IRGACURE 907 (trade name, produced by Ciba Geigy Corp.) and 0.4 parts by weight of photo sensitizer KAYACURE DETX (trade name, produced by Nippon Kayaku Co., Ltd.) were dissolved. Further, 264 parts by weight of the dispersion D of titanium dioxide, and 16 parts by weight of the marketed mixture DPHA (trade name, produced by Nippon Kayaku Co., Ltd.) of dipenta erythritol pentaacrylate and dipenta erythritol hexaacrylate were added to the mixture. Then the mixture was agitated at a room temperature for 30 minutes, and filtrated by the polypropylene filter (PPE-03) having porosities. The filter had a hole diameter of 3 microns. Thus, the filtrated solution was obtained as the coating solution for the high refractive index layer 50.

[Preparation of Coating Solution E for Low Refractive Index Layer]

Figure 12:
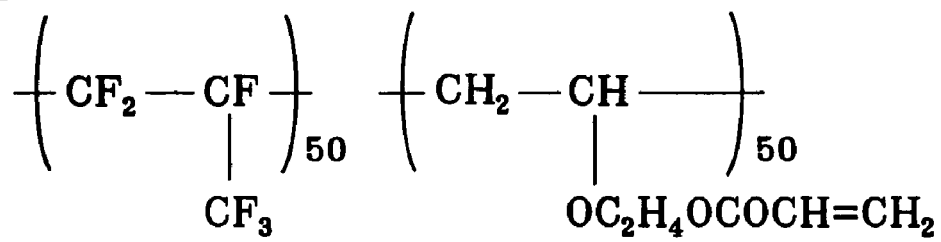
FIG. 12 is a view illustrating a formula of a first fluorine containing copolymer PF1.

A fluorine containing copolymer material PF1 in FIG. 12 was previously produced, and then dissolved in methyisobutylketone to obtain a copolymer solution containing 18.4 wt. % of the fluorine containing copolymer PF1 in FIG. 12. Further, 1.7 parts by weight of the photo polymerization initiator IRGACURE 907 (trade name, produced by Ciba Geigy Corp.) and 1.7 parts by weight of a reactive silicone X-22-164 (trade names, produced by Shinetsu Chemical Co., Ltd.) were added to 193 parts by weight of cyclohexanone and 623 parts by weight of methylethylketone. Then, 182 parts by weight of the copolymer solution having the copolymer PF1 was added to the mixture. Thereafter, the solution was agitated and filtrated by the polypropylene filter (PPE-03) having porosities. The filter had a hole diameter of 3 microns. Thus, the filtrated solution was obtained as the coating solution E for the low refractive index layer 44.

Previous production of the fluorine containing copolymer PF1 in FIG. 12 is described now. 40 ml of ethyl acetate, 14.7 grams of hydroxyethylvinylether (monomer), and 0.55 gram of dilauroyl peroxide were mixed in an autoclave with an agitator made of stainless, whose capacity was 100 ml. Gas in the autoclave was fed out by deaeration, and gaseous nitrogen was supplied and filled therein. Further, 25 grams of hexafluoropropylene (HFP) was supplied in the autoclave, and the temperature of the content in the autoclave was raised to 65° C. When the temperature was 65° C., the pressure in the autoclave was 5.4×10$^5$ Pa. This temperature was maintained continuously to perform chemical reaction for eight (8) hours. When the pressure became 3.2×10$^5$ Pa, the heating of the content was stopped and it was left and cooled by natural cooling. When the internal temperature drops and becomes equal to the room temperature, remaining monomers without reaction are removed. The reaction solution was taken out by opening the autoclave.

The reaction solution of polymer was added to an excess amount of hexane, and the solvent thereof was removed by decantation to obtain a precipitated polymer. This polymer was dissolved in a small amount of ethyl acetate, and the precipitation of the polymer was further made twice, completely to remove all the remaining monomers. Thereafter, the polymer was dried. The weight thereof was 28 grams. Then the dried polymer at 20 grams was dissolved to 100 ml of N,N-dimethyl acetamide. This solution was cooled with ice. In the cooled state, acrylic acid chloride of 11.4 grams was dropped down to the produced solution, and the produced solution was agitated at the room temperature for 10 hours. Then, ethyl acetate was added to the solution, which was rinsed with water. An organic layer was extracted from the same before making condensation. Polymer solution was obtained, and precipitated for a second time with hexane. Finally, 19 grams of the fluorine containing copolymer PF1 was obtained. The fluorine containing copolymer PF1 had a number-average molecular weight of 31,000, and a refractive index of 1.421.

[Preparation of Coating Solution F for the Low Refractive Index Layer]

A fluorine containing copolymer material PF2 depicted in FIG. 13 was prepared by the method which will be described later. The fluorine containing copolymer PF2 was dissolved at the ratio of 18.4 wt. % in methylisobutylketone to obtain a copolymer solution, and agitated. Besides, 3.4 parts by weight of the photo polymerization initiator (UVI16990, trade name, produced by Union Carbide Corporation) and 3.4 parts by weight of the reactive silicone (X-22-169AS, trade name, produced by Shinetsu Chemical Co., Ltd.) were added to 193 parts by weight of cyclohexanone and 623 parts by weight of methylethylketone. 182 parts by weight of the copolymer solution having PF2 of FIG. 13 was added to this mixture. Thereafter, the copolymer solution was agitated and filtrated by the polypropylene filter (PPE-03) having porosities. A diameter of each filter hold was 3 microns. Thus the filtrated solution was obtained as the coating solution F for the low refractive index layer 44.

Figure 13:
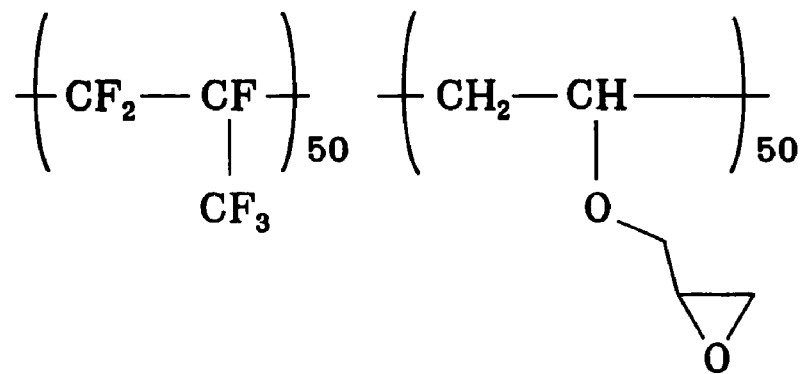
FIG. 13 is a view illustrating a formula of a second fluorine containing copolymer PF2.

Previous production of the fluorine containing copolymer PF2 of FIG. 13 is explained. 30 ml of ethyl acetate, 11.5 grams of glycidylvinylether (monomer), and 0.42 gram of dilauroyl peroxide were mixed in an autoclave with an agitator made of stainless, whose capacity was 100 ml. Gas in the autoclave was fed out by deaeration, and gaseous nitrogen was supplied and filled therein. Further, 21 grams of hexafluoropropylene (HFP) was supplied in the autoclave, and the temperature of the content in the autoclave was raised to 65° C. When the temperature was 65° C., the pressure in the autoclave was 6.2×10$^5$ Pa. This temperature was maintained continuously to perform chemical reaction for eight (8) hours. When the pressure became 3.6×10$^5$ Pa, the heating of the content was stopped and it was left and cooled by natural cooling.

When the internal temperature drops and becomes equal to the room temperature, remaining monomers without reaction are removed. The reaction solution was taken out by opening the autoclave. The polymer solution was added to an excess amount of hexane, and the solvent thereof was removed by decantation to obtain a precipitated polymer. This polymer was dissolved in a small amount of ethyl acetate, and the precipitation of the polymer was further made twice, completely to remove all the remaining monomers. The polymer was dried, to obtain fluorine containing copolymer PF2 of 21 grams. The fluorine containing copolymer PF2 had a number-average molecular weight of 28,000, and a refractive index of 1.424.

[Production of an Embossing Roller 22A]

A roll core of S45C steel after being hardened thermally had a diameter of 20 cm and a width of 12 cm, and was subjected to electrodischarge machining, so an embossing roller 22A was obtained, and had an arithmetic average roughness (Ra) of 0.3 micron, and an average cycle length of a protruding and retreating pattern (RSm) of 25 microns. Kerosene liquid was prepared and provided with 3 g/l of graphite particles having an average grain diameter of 1.5 microns. A die-sinker electrodischarge machining (EDM) device EA8 (trade name, produced by Mitsubishi Electric Corporation) was used. The roll core was subjected in the kerosene liquid to electrodischarge machining with a capacitor in a negative state at a copper electrode having a thickness of 0.5 mm and at a voltage of 350 V. The surface of the embossing roller 22A had Vickers hardness of 300 Hv.

[Production of an Embossing Roller 22B]

A roll core of S45C steel after being hardened thermally had a diameter of 20 cm and a width of 12 cm, and was subjected to plating to form a hard chrome plating layer on the roll core at a thickness of 50 microns. Then the roll core was subjected to electrodischarge machining the same as that for the embossing roller 22A. An embossing roller 22B was obtained, and had an arithmetic average roughness (Ra) of 0.6 micron, an average cycle length of a protruding and retreating pattern (RSm) of 13 microns, and a surface hardness of 900 Hv.

[Production of an Embossing Roller 22C]

A roll core of S45C steel after being hardened thermally had a diameter of 20 cm and a width of 12 cm, and was subjected to plating according to Kanigen plating (trade name, a plating system suggested by Japan Kanigen Co., Ltd.), so a plated layer was formed on the roll core at a thickness of 30 microns. Kerosene liquid was prepared and provided with 3 g/l of graphite particles having an average grain diameter of 1.5 microns. The roll core was subjected in the kerosene liquid to electrodischarge machining with a capacitor in a negative state at a brass electrode having a thickness of 2 mm and at a voltage of 350 V. Thus, an embossing roller 22C was obtained, and had an arithmetic average roughness (Ra) of 0.4 micron, an average cycle length of a protruding and retreating pattern (RSm) of 20 microns, and a surface hardness of 500 Hv.

[Production of an Embossing Roller 22D]

A roll core of S45C steel after being hardened thermally had a diameter of 20 cm and a width of 12 cm, and was subjected to plating according to Kanigen plating (trade name, a plating system suggested by Japan Kanigen Co., Ltd.). A plated layer was formed on the roll core at a thickness of 30 microns, before the roll core was thermally treated at 400° C. Kerosene liquid was prepared and provided with 3 g/l of graphite particles having an average grain diameter of 1.5 microns. The roll core was subjected in the kerosene liquid to electrodischarge machining with a capacitor in a negative state at a brass electrode having a thickness of 2 mm and at a voltage of 350 V. Thus, an embossing roller 22D was obtained, and had an arithmetic average roughness (Ra) of 0.4 micron, an average cycle length of a protruding and retreating pattern (RSm) of 18 microns, and a surface hardness of 900 Hv.

[Production of an Embossing Roller 22E]

A roll core of S45C steel after being hardened thermally had a diameter of 20 cm and a width of 12 cm, and was subjected to plating named Kaniboron plating (trade name, a plating system suggested by Japan Kanigen Co., Ltd.). A plated layer was formed on the roll core at a thickness of 30 microns, before the roll core was thermally treated at 400° C. Kerosene liquid was prepared and provided with 3 g/l of graphite particles having an average grain diameter of 1.5 microns. The roll core was subjected in the kerosene liquid to electrodischarge machining with a capacitor in a negative state at a brass electrode having a thickness of 2 mm and at a voltage of 350 V. Thus, an embossing roller 22E was obtained, and had an arithmetic average roughness (Ra) of 0.5 micron, an average cycle length of a protruding and retreating pattern (RSm) of 15 microns, and a surface hardness of 950 Hv.

[Production of an Embossing Roller 22F]

A roll core of S45C steel after being hardened thermally had a diameter of 20 cm and a width of 12 cm, and was subjected to plating to form a hard chrome plating layer with a thickness of 50 microns. Conditions for the electrodischarge machining were basically the same as those for the embossing roller 22B, but with a difference in that an electrode of brass was used, and that electrodischarge was effected with pulses at a frequency of 2 μsec by periodical switching of a power source. Thus, an embossing roller 22F was obtained, and had an arithmetic average roughness (Ra) of 0.3 micron, an average cycle length of a protruding and retreating pattern (RSm) of 35 microns, and a surface hardness of 900 Hv.

[Production of an Embossing Roller 22G]

A roll core of S45C steel after being hardened thermally had a diameter of 20 cm and a width of 12 cm, and was subjected to plating to form a hard chrome plating layer with a thickness of 50 microns. Conditions for the electrodischarge machining were basically the same as those for the embossing roller 22B, but with a difference in that an electrode of brass was used, and that electrodischarge was effected in a positive state. Thus, an embossing roller 22G was obtained, and had an arithmetic average roughness (Ra) of 0.8 micron, an average cycle length of a protruding and retreating pattern (RSm) of 42 microns, and a surface hardness of 900 Hv.

[Production of an Embossing Roller 22H]

A roll core of S45C steel after being hardened thermally had a diameter of 20 cm and a width of 12 cm, and was subjected to plating to form a hard chrome plating layer with a thickness of 50 microns. Conditions for the electrodischarge machining were basically the same as those for the embossing roller 22B, but with a difference in that an electrode of brass was used and that no graphite particles were added. Thus, an embossing roller 22H was obtained, and had an arithmetic average roughness (Ra) of 0.4 micron, an average cycle length of a protruding and retreating pattern (RSm) of 23 microns, and a surface hardness of 900 Hv.

[Production of an Embossing Roller 22I]

A roll core of S45C steel after being hardened thermally had a diameter of 20 cm and a width of 12 cm, and was subjected to plating to form a hard chrome plating layer with a thickness of 50 microns. Conditions for the electrodischarge machining were basically the same as those for the embossing roller 22B, but with a difference in that an electrode of brass was used, and that silicon particles with an average grain diameter of 7 microns were added in place of graphite particles. Thus, an embossing roller 22I was obtained, and had an arithmetic average roughness (Ra) of 0.6 micron, an average cycle length of a protruding and retreating pattern (RSm) of 15 microns, and a surface hardness of 900 Hv.

[Production of an Embossing Roller 22J]

A roll core of S45C steel after being hardened thermally had a diameter of 20 cm and a width of 12 cm, and was subjected to plating to form a hard chrome plating layer with a thickness of 50 microns. Conditions for the electrodischarge machining were basically the same as those for the embossing roller 22B, but with a difference in that an electrode of brass was used, and that the voltage was as low as 70 V. Thus, an embossing roller 22J was obtained, and had an arithmetic average roughness (Ra) of 0.1 micron, an average cycle length of a protruding and retreating pattern (RSm) of 12 microns, and a surface hardness of 900 Hv.

Example 1, No. 1

Triacetyl cellulose film TAC-TD80U (trade name, produced by Fuji Photo Film Co., Ltd.) had a thickness of 80 microns. One surface of the triacetyl cellulose film was embossed by the one-surface embossing calender device 13 (produced by Yuri Roll Co., Ltd.) including the embossing roller 22H, to obtain Film Sample 1 of the antiglare antireflection film 11b. The backup roller 23 without machining for an embosser was combined with the embossing roller 22H. The linear contact pressure was $5.0 \times 10^3$ N/cm. The temperature of preheating was room temperature. The temperature of the embossing roller 22 was 120° C. The temperature of the backup roller 23 was room temperature. Transporting speed was 1 m/min. The embossing roller 22H was exactly as described above.

Example 1, No. 2

Polycarbonate film (PURE ACE, trade name, produced by Teijin Co., Ltd.) was prepared, and was 100 microns thick. One surface of the polycarbonate film was embossed in the same manner as Example 1, No. 1, to obtain Film Sample 2.

Example 1, No. 3

This was produced in the same manner as Example 1, No. 2 but with a difference in that the embossing roller 22F was used in place of the embossing roller 22H. Film Sample 3 was obtained.

Example 1, No. 4

Triacetyl cellulose film TAC-TD80U (trade name, produced by Fuji Photo Film Co., Ltd.) had a thickness of 80 microns, and was coated with the above-described coating solution for the hard coat layer 43 by a gravure coater, and was dried for two (2) minutes at 100° C. Then ultraviolet rays were applied to the coating solution to cure the same, to form the hard coat layer 43, which had a refractive index of 1.51 and a thickness of 7 microns.

To the hard coat layer 43, the solution for the middle refractive index layer was applied to form a coating by use of a gravure coater, and dried at 100° C., and cured by applying ultraviolet rays. The middle refractive index layer 55 was produced, and had a refractive index of 1.63 and a thickness of 67 nm.

To the middle refractive index layer 55, the solution for the high refractive index layer was applied to form a coating by use of a gravure coater, and dried at 100° C., and cured by applying ultraviolet rays. The high refractive index layer 50 was produced, and had a refractive index of 1.90 and a thickness of 107 nm.

To the high refractive index layer 50, the solution E for the low refractive index layer was applied to form a coating by use of a gravure coater, and dried at 120° C. for eight (8) minutes, then cured by application of ultraviolet rays. The low refractive index layer 44 was produced, and had a refractive index of 1.43 and a thickness of 86 nm. Thus, the anti-reflection film 11a was obtained.

The coated surface of the anti-reflection film 11a was embossed by the one-surface embossing calender device 13 (produced by Yuri Roll Co., Ltd.) including the embossing roller 22H, to obtain Sample 4 of the antiglare anti-reflection film 11b. The backup roller 23 without machining for an embosser was combined with the embossing roller 22H. The linear contact pressure was $5.00 \times 10^3$ N/cm. The temperature of preheating was 90° C. The temperature of the embossing roller 22 was 160° C. The temperature of the backup roller 23 was a room temperature. Transporting speed was 1 m/min.

Example 1, No. 5

This was basically the same as Example 1, No. 4, but had a difference in that the embossing roller 22A was used in place of the embossing roller 22H. Film Sample 5 of the antiglare anti-reflection film 11b was produced.

Example 1, No. 6

This was basically the same as Example 1, No. 4, but had a difference in that the embossing roller 22B was used in place of the embossing roller 22H. Film Sample 6 of the antiglare anti-reflection film 11b was produced.

Example 1, No. 7

This was basically the same as Example 1, No. 4, but had a difference in that the embossing roller 22C was used in place of the embossing roller 22H. Film Sample 7 of the antiglare anti-reflection film 11b was produced.

Example 1, No. 8

This was basically the same as Example 1, No. 4, but had a difference in that the embossing roller 22D was used in place of the embossing roller 22H. Film Sample 8 of the antiglare anti-reflection film 11b was produced.

Example 1, No. 9

This was basically the same as Example 1, No. 4, but had a difference in that the embossing roller 22E was used in place of the embossing roller 22H. Film Sample 9 of the antiglare anti-reflection film 11b was produced.

Example 1, No. 10

This was basically the same as Example 1, No. 4, but had a difference in that the embossing roller 22I was used in place of the embossing roller 22H. Film Sample 10 of the antiglare anti-reflection film 11b was produced.

Example 1, No. 11

This was basically the same as Example 1, No. 4, but had a difference in that the embossing roller 22G was used in place of the embossing roller 22H. Film Sample 11 of the antiglare anti-reflection film 11b was produced.

Example 1, No. 12

This was basically the same as Example 1, No. 4, but had a difference in that the embossing roller 22J was used in place of the embossing roller 22H. Film Sample 12 of the antiglare anti-reflection film 11b was produced.

The Film Samples according to Example 1, Nos. 1-12 were evaluated for the following items.

(1) Average Reflectance (%)

A spectrophotometer V-550 (trade name, produced by JASCO Corporation) was provided with an adapter ARV-474 (trade name) to measure the specular reflectance at an exiting angle of −5 degrees, according to the incident light of wavelength in the range of 380-780 nm at the incident angle of 5 degrees. Then the average of the specular reflectance of the reflected light in the range of 450-650 nm was calculated to evaluate anti-reflection property.

(2) Arithmetic Average Roughness (Ra)

The embossed surface of the film was subjected to measurement of the roughness by use of a micromap device produced by Ryoka Systems Inc.

(3) Pencil Hardness

The pencil hardness is used to represent a grade of resistance to scratches. The evaluation of pencil hardness was according to JIS-K-5400. The antiglare anti-reflection film 11b of Samples 1-12 was set in a controlled environment with the temperature of 25° C. and the humidity of 60% RH for two (2) hours. After this, the film surface of the antiglare anti-reflection film 11b was scratched with H-5H test pencils determined by JIS-S-6006. Thereby, a force of 500 grams was applied to the test pencil and for five times. For the evaluation of the pencil hardness, two grades of OK and NG were used. Five hardness values were compared, so that one of the hardness values that is that highest among the OK values was determined as an evaluated pencil hardness.

OK: Good, as no scratch or only one scratch remained on the film surface after the five tests.

NG: Poor, as three or more scratches remained on the film surface after the five tests.

(4) Resistance to Steel Wool rubbing

Steel wool of type #0000 was placed on each of Samples 1-12. Load of 1.96 N/cm² was applied to the steel wool, which was moved back and forth for 10 times. After this, occurrence of scratches was observed, and evaluated according to the following four grades.

A: Lack of scratches

B: Existence of only fine scratches

C: Existence of distinctly visible scratches

D: Existence of numerous distinctly visible scratches (5) Dazzling Appearance

Film Samples 1-12 were placed on cells of 133 ppi (pixels per inch) at a distance of 1 mm. Dazzling appearance, namely deviations in brightness caused by protruding portions of the surface of the film, was evaluated by human eyes according to the following grades.

A: Lack of dazzling appearance

B: Only slight dazzling appearance

C: Visible dazzling appearance

D: Distinctly visible dazzling appearance (6) Evaluation of the Antiglare Properties An image of a fluorescent lamp of 8,000 cd/m² without a lampshade, reflector or louver was mirrored on each surface of Samples 1-12. An unsharp degree of a reflected image of the flourescent lamp on Samples 1-12 were evaluated by human eyes.

○: considerably unsharp state of fluorescent light, with antiglare properties.

X: very sharp state or no unsharp state of fluorescent light, considerably short of antiglare properties.

(7) Surface Properties of Film Surface

Surface properties of the film surface of the antiglare antireflection film 11b being embossed were evaluated in a qualitative manner. Two pieces of polarizing films were attached to respectively two surfaces of a glass plate in a square shape of 10×10 cm, and were arranged in a manner of the cross Nicol polarizer. Also, each of Samples 1-12 was attached to one of the two polarizing films by directing the embossed surface upwards. The embossed surface was observed at a distance of two (2) meters from a white illuminating bulb of 100 W. The observed surface was evaluated according to the five (5) ranks of the following.

Rank 5: intensity of reflected light was visually deviated, to give granular surface properties.

Rank 1: intensity of reflected light was visually regularized, to give glossy or subdued surface properties.

Ranks 1 and 5 were predetermined at two extreme ranks, with reference to which Ranks 2-4 were relatively evaluated.

utes at 100° C. Then the coating was cured by application of ultraviolet rays, to obtain the primer layer 42. The primer layer 42 was 7 microns thick, and had a refractive index of 1.51.

To the primer layer 42, the coating solution for the hard coat layer was applied by a gravure coater, and was dried for two (2) minutes at 100° C. Then the coating was cured by applying ultraviolet rays, to form the hard coat layer 43. This was 7 microns thick, and had a refractive index of 1.51.

The hard coat layer 43 was coated by a gravure coater with the above-described coating solution for forming the middle refractive index layer. The solution was dried at 100° C., and was cured by application of ultraviolet rays, to obtain the middle refractive index layer 55. The middle refractive index layer 55 was 67 nm thick, and had a refractive index of 1.63.

The middle refractive index layer 55 was coated by a gravure coater with the above-described coating solution for forming the high refractive index layer. The solution was dried at 100° C., and was cured by application of ultraviolet rays, to obtain the high refractive index layer 50. The high refractive index layer 50 was 107 nm thick, and had a refractive index of 1.90.

To the high refractive index layer 50, the solution F for the low refractive index was applied to form a coating by use of a gravure coater, and dried at 120° C. for eight (8) minutes, and

| Example | Average reflectance (%) | Roughness Ra (microns) | Pencil hardness | Resistance to steel wool rubbing | Dazzling appearance | Antiglare properties | Rank of surface properties |
|---|---|---|---|---|---|---|---|
| 1, No. 1 | 1.82 | 0.049 | H | D | B | ○ | 1 |
| 1, No. 2 | 2.19 | 0.041 | H | C | B | ○ | 1 |
| 1, No. 3 | 2.18 | 0.038 | H | C | D | ○ | 4 |
| 1, No. 4 | 0.29 | 0.024 | 3H | B | B | ○ | 1 |
| 1, No. 5 | 0.29 | 0.018 | 3H | B | B | ○ | 3 |
| 1, No. 6 | 0.49 | 0.021 | 3H | B | B | ○ | 2 |
| 1, No. 7 | 0.28 | 0.019 | 3H | B | B | ○ | 3 |
| 1, No. 8 | 0.28 | 0.016 | 3H | B | B | ○ | 2 |
| 1, No. 9 | 0.29 | 0.023 | 3H | B | B | ○ | 1 |
| 1, No. 10 | 0.29 | 0.022 | 3H | B | B | ○ | 1 |
| 1, No. 11 | 0.29 | 0.023 | 3H | B | D | ○ | 5 |
| 1, No. 12 | 0.28 | 0.008 | 3H | B | B | X | 5 |

In Samples 1, 2 and 4-10, the arithmetic average roughness was sufficiently high as embossed with the embossing roller produced according to the invention. High antiglare properties were obtained by preventing dazzling appearance. However, Samples 3, 11 and 12 did not have sufficient antiglare properties, and were not adequate as optical film for the displaying technique of high definition. In relation to a surface properties of the image display device, various types were obtainable in ranks including Rank 1 with a glossy or subdued quality, and Rank 3 with a moderate granular quality by varying a surface material of the producing embosser. It is concluded that the invention was effective in producing various modifications of the display devices typically as a commercial value of products considerably depends on the surface properties of an image screen, for example, a TV set.

Example 2, No. 1

Triacetyl cellulose film (cellulose triacetate film) TAC-TD80U (trade name, produced by Fuji Photo Film Co., Ltd.) was prepared, and was 80 microns thick, and was coated with the above-described primer layer forming coating solution A by a gravure coater. The solution was dried for two (2) min-cured by applying ultraviolet rays, to form the low refractive index layer 44. Thus, the anti-reflection film 11a was produced. The low refractive index layer 44 had a thickness of 86 nm and a refractive index of 1.43.

The coated surface of the anti-reflection film was embossed by the one-surface embossing calender device 13 (produced by Yuri Roll Co., Ltd.) including the embossing roller 22A, to obtain Film Sample 13 of the antiglare anti-reflection film 11b. The backup roller 23 without machining for an embosser was combined with the embossing roller 22A. The linear contact pressure was 5.00×10$^3$ N/cm. The temperature of preheating was 70° C. The temperature of the embossing roller 22A was 140° C. The temperature of the backup roller 23 was a room temperature. Transporting speed was 5 m/min.

Example 2, No. 2

This was basically the same as Example 2, No. 1 but with a difference in that the embossing roller 22B was used in place of the embossing roller 22A. Film Sample 14 of the antiglare anti-reflection film 11b was produced.

Example 2, No. 3

This was basically the same as Example 2, No. 1 but with a difference in that the embossing roller 22F was used in place of the embossing roller 22A. Film Sample 15 of the antiglare anti-reflection film 11b was produced.

Example 2, No. 4

This was basically the same as Example 2, No. 1 but with a difference in that the embossing roller 22J was used in place of the embossing roller 22A. Film Sample 16 of the antiglare anti-reflection film 11b was produced.

Example 2, No. 5

Triacetyl cellulose film (cellulose triacetate film) TAC-TD80U (trade name, produced by Fuji Photo Film Co., Ltd.) was prepared, and was 80 microns thick, and was coated with the above-described primer layer forming coating solution B by a gravure coater. The solution was dried for two (2) minutes at 100° C. Then the coating was cured by application of ultraviolet rays, to obtain the primer layer 42. The primer layer 42 had a refractive index of 1.51, and was 7 microns thick.

To the primer layer 42, the above-described solution for the hard coat layer was applied to form a coating by use of a gravure coater, and dried for two (2) minutes at 100° C. The coating was cured by applying ultraviolet rays, to form the hard coat layer 43. The hard coat layer 43 had a refractive index of 1.51 and a thickness of 7 microns.

To the hard coat layer 43, the above-described solution for the middle refractive index layer was applied to form a coating by use of a gravure coater, and dried at 100° C., and was cured by applying ultraviolet rays, to form the middle refractive index layer 55. The middle refractive index layer 55 had a refractive index of 1.63 and a thickness of 67 nm.

To the middle refractive index layer 55, the above-described solution for the high refractive index layer was applied to form a coating by use of a gravure coater, and dried at 100° C., and was cured by applying ultraviolet rays, to form the high refractive index layer 50. The high refractive index layer 50 had a refractive index of 1.90 and a thickness of 107 nm.

To the high refractive index layer 50, the above-described solution F for the low refractive index layer was applied to form a coating by use of a gravure coater, and dried at 120° C. for eight (8) minutes, and was cured by applying ultraviolet rays, to form the low refractive index layer 44. Then the anti-reflection film 11a was obtained. The low refractive index layer 44 had a refractive index of 1.43 and a thickness of 86 nm.

The coated surface of the anti-reflection film was embossed by the one-surface embossing calender device 13 (produced by Yuri Roll Co., Ltd.) including the embossing roller 22C, to obtain Sample 17 of the antiglare anti-reflection film 11b. The backup roller 23 without machining for an embosser was combined with the embossing roller 22C. The linear contact pressure was $5.00 \times 10^3$ N/cm. The temperature of preheating was 60° C. The temperature of the embossing roller 22 was 140° C. The temperature of the backup roller 23 was a room temperature. Transporting speed was 3 m/min.

Example 2, No. 6

This was basically the same as Example 2, No. 5 but with a difference in that the embossing roller 22E was used in place of the embossing roller 22C. Film Sample 18 of the antiglare anti-reflection film 11b was produced.

Example 2, No. 7

This was basically the same as Example 2, No. 5 but with a difference in that the embossing roller 22H was used in place of the embossing roller 22C. Film Sample 19 of the antiglare anti-reflection film 11b was produced.

Example 2, No. 8

This was basically the same as Example 2, No. 5 but with a difference in that the embossing roller 22G was used in place of the embossing roller 22C. Film Sample 20 of the antiglare anti-reflection film 11b was produced.

The samples produced according to Example 2, Nos. 1-8 were subjected to evaluation in the same manner related to the items and methods as Example 1, Nos. 1-12. Results of the evaluation are indicated in the following table. The signs for grading are the same as the in the foregoing table.

| Example | Average reflectance (%) | Roughness Ra (microns) | Pencil hardness | Resistance to steel wool rubbing | Dazzling appearance | Antiglare properties | Rank of surface properties |
|---|---|---|---|---|---|---|---|
| 2, No. 1 | 0.29 | 0.018 | 3H | B | B | ○ | 3 |
| 2, No. 2 | 0.29 | 0.029 | 3H | B | B | ○ | 2 |
| 2, No. 3 | 0.29 | 0.024 | 3H | B | D | ○ | 4 |
| 2, No. 4 | 0.29 | 0.011 | 3H | B | B | Between ○ & X | 5 |
| 2, No. 5 | 0.28 | 0.032 | 2H | B | B | ○ | 3 |
| 2, No. 6 | 0.28 | 0.028 | 2H | B | B | ○ | 1 |
| 2, No. 7 | 0.29 | 0.034 | 2H | B | B | ○ | 1 |
| 2, No. 8 | 0.28 | 0.048 | 2H | B | D | ○ | 5 |

The arithmetic average roughness was sufficiently high for Samples 13, 14 and 17-19 embossed with the embossing roller produced according to the invention, and with the layer structure including the primer layer, the hard coat layer and the anti-reflection layer on the film support. High antiglare properties were obtained, and dazzling appearance was prevented. However, Samples 15, 16 and 20, which were obtained by use of the embosser produced differently from the electrodischarge machining of the invention, did not have sufficient antiglare properties, and were not adequate as optical film in the displaying technique of high definition. In relation to surface properties of the image display device, various types were obtainable in ranks including Rank 1 with a glossy or subdued quality, and Rank 3 with a moderate granular quality by varying a surface material of the producing embosser. It is concluded that the invention was effective in producing various modifications of the display devices typically as a commercial value of products considerably depends on the surface properties of an image screen, for example, a TV set. Furthermore, Samples 13-20 could provide adequate antiglare properties even with the embossing roller obtained after high-speed embossing.

Example 3

Sample 7 produced according to Example 1, No. 7 was dipped in 2.0 N aqueous solution of NaOH at 55° C. A back surface of the sample formed from the triacetyl cellulose was saponified. Triacetyl cellulose film TAC-TD80U (trade name, produced by Fuji Photo Film Co., Ltd.) was 80 microns thick, and saponified in the same condition. A polarizer was prepared by a process in which iodine was adsorbed to polyvinyl alcohol, and the polyvinyl alcohol was stretched. Then the anti-reflection film and the triacetyl cellulose film were attached to respectively opposite surfaces of the polarizer, by way of protecting films, so that a test polarizing plate is obtained. The polarizing plate was combined with the LCD display device. The LCD display device was for a notebook personal computer including TN liquid crystal display of a transmission type, and had originally had a polarizing plate on a display surface. The test polarizing plate was attached on the LCD display device in place of the original polarizing plate. (Note that the LCD display device included the polarization separation film D-BEF disposed between a backlight and a liquid crystal cell, D-BEF (trade name) being produced by Sumitomo 3M Ltd. and having a polarized light selective layer.) At this time, the anti-reflection film was positioned on the viewing side of the display surface. As a result of testing the LCD display device, mirroring of a background object or scene on the display panel was not observed nearly at all. The displaying quality was very high.

Example 4

Conditions were basically the same as Example 3 to produce a polarizing plate, but had two differences. A first difference of the two was in that for saponification, the back surface of the antiglare anti-reflection film 11b was coated by the #3 bar with 1.0 N solution of KOH in water/isopropanol. The second difference was in that the surface temperature was maintained at 40° C. for 10 seconds, before the coating was washed with water, and dried. So the polarizing plate was obtained. Note that the solution included the water and isopropanol at the wt. % ratio of 75/25 for the water to isopropanol. In the same manner as Example 3, an image display device is obtained by use of the polarizing plate. As a result, resolution and quality of the display were very high in a similar manner to Example 3.

Example 5

This was basically the same as Example 3, but had two differences. A first difference of the two was that a wide view film was used on the side of the liquid crystal cell of the polarizing filter on the viewing side of the transmission-type TN liquid crystal cell, in place of the protection film according to Example 3. The second of the two was that a wide view film was used on the side of the liquid crystal cell of the polarizing filter on the backlight side of the same, in place of the protection film according to Example 3. Both of the wide view films were Wide View Film SA-12B, trade name, produced by Fuji Photo Film Co., Ltd. This is the wide view film including an optical compensation layer in which a disk-shaped surface of a unit constructing discotic structure is inclined to a surface of the transparent support, and in which an angle defined between the respective surfaces of the unit constructing discotic structure and the transparent support varies in a thickness direction of an optical anisotropic layer. In the LCD display device in this example, the contrast was excellent in a bright room, the view angle in every direction was considerably wide, and the image could be perceived with great ease. Accordingly, the quality of display was high.

Example 6

The antiglare anti-reflection film 11b of Film Sample 7 according to Example 1, No. 7 was attached with pressure-sensitive adhesive agent to a glass panel in a front of an organic electro luminescence (EL) display device. As a result, it was observed that reflection on the glass surface was prevented in the display device, which had a high performance in easy recognition of images.

Example 7

To a surface of the film-fitted polarizing plate of Example 3 opposite to a surface with the anti-reflection film, the λ/4 plate was attached. Those in combination were attached to a glass panel in a front of an organic electro luminescence (EL) display device. As a result, it was observed that reflection outside and inside the glass panel was prevented in the display device, which had a high performance in easy recognition of images.

Example 8

Sample 14 produced according to Example 2, No. 2 was dipped in 2.0 N aqueous solution of NaOH at 55° C. A back surface of the sample formed from the triacetyl cellulose was saponified. Triacetyl cellulose film TAC-TD80U (trade name, produced by Fuji Photo Film Co., Ltd.) was 80 microns thick, and saponified in the same condition. A polarizer was prepared by a process in which iodine was adsorbed to polyvinyl alcohol, and the polyvinyl alcohol was stretched. Then the anti-reflection film and the triacetyl cellulose film were attached to respectively opposite surfaces of the polarizer, by way of protecting films, so that a test polarizing plate is obtained. The polarizing plate was combined with the LCD display device. The LCD display device was for a notebook personal computer including TN liquid crystal display of a transmission type, and had originally had a polarizing plate on a display surface. The test polarizing plate was attached on the LCD display device in place of the original polarizing plate. (Note that the LCD display device included the polarization separation film D-BEF between a backlight and a liquid crystal cell, D-BEF (trade name) being produced by Sumitomo 3M Ltd. and having a polarized light selective layer.) At this time, the anti-reflection film was positioned on the viewing side of the display surface. As a result of testing the LCD display device, mirroring of a background object or scene on the display panel was not observed nearly at all. The displaying quality was very high.

Example 9

Conditions were basically the same as Example 8 to produce a polarizing plate, but had two differences. A first difference of the two was in that for saponification, the back surface of the antiglare anti-reflection film 11b was coated by the #3 bar with 1.0 N solution of KOH in water/isopropanol. The second difference was in that the surface temperature was maintained at 40° C. for 10 seconds, before the coating was washed with water, and dried, by which the polarizing plate was obtained. Note that the solution included the water and isopropanol at the wt. % ratio of 75/25 for the water to isopropanol. In the same manner as Example 8, an image display device is obtained by use of the polarizing plate. As a result, resolution and quality of the display were very high in a similar manner to Example 8.

Example 10

This was basically the same as Example 8, but had two differences. A first difference of the two was that a wide view film was used on the side of the liquid crystal cell of the polarizing filter on the viewing side of the transmission-type TN liquid crystal cell, in place of the protection film according to Example 8. The second of the two was that a wide view film was used on the side of the liquid crystal cell of the polarizing filter on the backlight side of the same, in place of the protection film according to Example 8. Both of the wide view films were Wide View Film SA-12B, trade name, produced by Fuji Photo Film Co., Ltd. This is the wide view film including an optical compensation layer in which a disk-shaped surface of a unit constructing discotic structure is inclined to a surface of the transparent support, and in which an angle defined between the respective surfaces of the unit constructing discotic structure and the transparent support varies in a thickness direction of an optical anisotropic layer. In the LCD display device in this example, the contrast was excellent in a bright room, the view angle in every direction was considerably wide, and the image could be perceived with great ease. Accordingly, the quality of display was high.

Example 11

The antiglare anti-reflection film 11b of Film Sample 17 according to Example 2, No. 5 was attached with pressure-sensitive adhesive agent to a glass panel in a front of an organic electro luminescence (EL) display device. As a result, it was observed that reflection on the glass surface was prevented in the display device, which had a high performance in easy recognition of images.

Example 12

To a surface of the film-fitted polarizing plate of Example 8 opposite to a surface with the anti-reflection film, the λ/4 plate was attached. Those in combination were attached to a glass panel in a front of an organic electro luminescence (EL) display device. As a result, it was observed that reflection outside and inside the glass panel was prevented in the display device, which had a high performance in easy recognition of images.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An antiglare film producing method of film production by surface embossing to polymer film, in which said polymer film includes a support and an anti-reflection layer overlaid thereon, in which an embosser is used for surface embossing to a surface of said anti-reflection layer or a back surface of said support, said antiglare film producing method comprising:
   producing said embosser according to electrically negative electrodischarge machining in which liquid with kerosene is used, wherein said liquid includes particles having an average grain diameter equal to or more than 1 micron and equal to or less than 10 microns at an amount equal to or more than 1 gram per liter and equal to or less than 20 grams per liter;
   wherein a surface of said embosser has an arithmetic average roughness Ra equal to or more than 0.3 micron and equal to or less than 1.0 micron, and has a protruding and retreating pattern with an average cycle length RSm equal to or more than 5 microns and equal to or less than 30 microns; and
   wherein said polymer film has a hardcoat layer having a thickness in the range of 0.05 to 5 microns.

2. An antiglare film producing method as defined in claim 1,
   wherein a discharging electrode produced from material containing copper or brass is used, and electrically negative voltage is applied thereto and is equal to or more than 100 V and equal to or less than 400 V, and
   wherein said particles are formed from at least one of graphite, silicon, and molybdenum sulfide.

3. An antiglare film producing method as defined in claim 1, wherein said embosser is produced from material having Vickers hardness equal to or more than 500 Hv and equal to or less than 1,500 Hv.

4. An antiglare film producing method as defined in claim 1, wherein said embosser is produced from material plated with a selected one of: a hard chrome plating; a nickel plating containing phosphorus or a combination of phosphorus and boron; a chrome plating or nickel plating formed by simultaneous precipitation of particles of at least one compound selected from titanium carbide (TiC), tungsten carbide (WC), silicon carbide (SiC), boron carbide ($B_4C$), and titanium boride ($TiB_2$).

5. An antiglare film producing method as defined in claim 4, further comprising a step of thermally hardening a plated layer formed by said plating; said thermal hardening is effected at temperature equal to or more than 300° C. and equal to or less than 1000° C., and for at least one hour.

6. An antiglare film producing method as defined in claim 1, wherein said polymer film contains cellulose acylate.

7. An antiglare film producing method as defined in claim 1, wherein said polymer film has a multi-layer structure, and further includes the hard coat layer disposed between said support and said anti-reflection layer.

8. An antiglare film producing method as defined in claim 1, wherein said polymer film has a multi-layer structure, and further includes:
   a primer layer disposed between said support and said anti-reflection layer; and
   the hard coat layer disposed between said primer layer and said anti-reflection layer.

9. The antiglare film producing method as defined in claim 1, further comprising the steps of:
   preheating said polymer film, where a temperature of said polymer film is gradually raised from room temperature to embossing temperature; and
   embossing said polymer film after said preheating.

* * * * *